(12) United States Patent
Morisawa

(10) Patent No.: US 6,615,940 B2
(45) Date of Patent: Sep. 9, 2003

(54) CONTROL SYSTEM FOR VEHICLE HAVING FUEL CELL

(75) Inventor: Kunio Morisawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/736,145

(22) Filed: Dec. 15, 2000

(65) Prior Publication Data

US 2001/0008192 A1 Jul. 19, 2001

(30) Foreign Application Priority Data

Jan. 19, 2000 (JP) .................................... 2000-010836

(51) Int. Cl.[7] .............................................. B60K 1/00
(52) U.S. Cl. .................................... 180/65.1; 180/165
(58) Field of Search ............................ 180/65.1, 65.2, 180/65.3, 65.4, 165, 54.1, 197

(56) References Cited

U.S. PATENT DOCUMENTS

| | | | | |
|---|---|---|---|---|
| 786,376 A | * | 4/1905 | Nilson ............................ 123/2 |
| 1,790,634 A | * | 1/1931 | Arendt ...................... 180/65.4 |
| 3,614,564 A | * | 10/1971 | Hirotsu et al. ................. 318/2 |
| 3,623,568 A | * | 11/1971 | Mori ........................... 180/15 |
| 3,743,900 A | * | 7/1973 | Johansson .................... 318/52 |
| 4,233,858 A | * | 11/1980 | Rowlett ..................... 180/65.2 |
| 5,318,142 A | * | 6/1994 | Bates et al. ................ 180/65.2 |
| 5,355,749 A | * | 10/1994 | Obara et al. .................. 477/15 |
| 5,487,002 A | * | 1/1996 | Diller et al. ................ 320/128 |
| 5,532,573 A | * | 7/1996 | Brown et al. ................. 322/22 |
| 5,678,647 A | * | 10/1997 | Wolfe et al. ............... 180/65.3 |
| 5,830,593 A | * | 11/1998 | Nielson ..................... 180/65.3 |
| 5,939,794 A | * | 8/1999 | Sakai et al. ................ 290/40 A |
| 5,950,752 A | * | 9/1999 | Lyons .......................... 165/41 |
| 5,984,034 A | * | 11/1999 | Morisawa et al. ......... 180/65.2 |
| 5,988,885 A | * | 11/1999 | Heshmat ..................... 384/106 |
| 5,991,670 A | * | 11/1999 | Mufford et al. ............ 180/65.1 |
| 6,122,588 A | * | 9/2000 | Shehan et al. .............. 180/167 |
| 6,158,541 A | * | 12/2000 | Tabata et al. ................ 180/165 |
| 6,209,672 B1 | * | 4/2001 | Severinsky ................ 180/65.2 |
| 6,223,844 B1 | * | 5/2001 | Greenhill et al. .......... 180/65.1 |
| 6,242,873 B1 | * | 6/2001 | Drozdz et al. .............. 318/139 |
| 6,291,953 B1 | * | 9/2001 | Lovatt et al. ............... 318/434 |
| 6,378,636 B1 | * | 4/2002 | Worrel ...................... 180/65.2 |
| 6,379,828 B1 | * | 4/2002 | Worth ......................... 429/13 |
| 6,380,638 B1 | * | 4/2002 | Bitsche et al. .............. 290/1 R |
| 6,484,830 B1 | * | 11/2002 | Gruenwald et al. ........ 180/65.2 |
| 6,498,967 B1 | * | 12/2002 | Hopkins et al. ............... 701/1 |
| 6,499,549 B2 | * | 12/2002 | Mizon et al. .............. 180/65.6 |
| 2002/0007974 A1 | * | 1/2002 | Nagano et al. ............ 180/65.2 |
| 2002/0023789 A1 | * | 2/2002 | Morisawa et al. ......... 180/65.2 |

FOREIGN PATENT DOCUMENTS

| JP | 50-31516 | * 3/1975 |
|---|---|---|
| JP | 9-298803 | * 11/1997 |

* cited by examiner

Primary Examiner—Lesley D. Morris
Assistant Examiner—Paul Royal, Jr.
(74) Attorney, Agent, or Firm—Oblon, Spivak, McClelland, Maier & Neustadt, P.C.

(57) ABSTRACT

A control system of a vehicle including a fuel cell and an electric motor that drives drive wheels of the vehicle with electric energy generated by the fuel cell is provided wherein a traction controller controls the output of the drive wheels so as to secure tractive force of the vehicle when a certain traction control start condition is satisfied.

48 Claims, 10 Drawing Sheets

CONTROL SYSTEM FOR VEHICLE HAVING FUEL CELL

INCORPORATION BY REFERENCE

The disclosure of Japanese Patent Application No. HEI 2000-010836 filed on Jan. 19, 2000 including the specification, drawings and abstract is incorporated herein by reference in its entirety.

BACKGROUND OF THE INVENTION

1. Field of the Invention

The invention relates to a control system for a vehicle having a fuel cell, and an electric motor that is actuated by electric energy generated by the fuel cell.

2. Description of Related Art

Japanese Patent Laid-Open Publication No. SHO 50-31516 discloses a known type of vehicle which has a fuel cell and an electric motor for driving drive wheels of the vehicle through the use of electric energy generated by the fuel cell. In a four-wheel drive vehicle as disclosed in Japanese Patent Laid-Open Publication No. HEI 9-298803, an electric motor for driving drive wheels of the vehicle by use of electric energy generated by a fuel cell is used as at least one of a plurality of driving motors respectively provided for mutually independent front and rear wheel drive systems.

However, the above-mentioned publications disclosing the known vehicles provided with fuel cells do not disclose a technology for adequately controlling the drive systems, fuel cell, and others when one or more of the drive wheels slips, thus leaving a possibility for various improvements. For example, a vehicle using a fuel cell as an electric energy source for an electric motor may suffer from deterioration in the driving performance of the vehicle and the behavior of the vehicle when a drive wheel slips, for example, during four-wheel drive running, as compared with a conventional vehicle including an electric-energy storage device as an electric energy source for an electric motor. This problem may be caused by the properties of fuel cells, in particular, relatively low responsiveness.

SUMMARY OF THE INVENTION

The invention has been developed in the light of the above-described circumstances. It is therefore an object of the invention to provide a control system that controls a vehicle provided with a fuel cell so as to prevent the deterioration in the driving performance of the vehicle and the behavior of the vehicle at the time of slipping of a drive wheel, irrespective of the use of the fuel cell as an electric energy source for an electric motor.

To accomplish the above and other objects, the present invention provides a control system of a vehicle including a fuel cell and an electric motor that drives drive wheels of the vehicle with electric energy generated by the fuel cell, which control system comprises a traction controller that controls output of the drive wheels so as to secure tractive force of the vehicle when a predetermined traction control start condition is satisfied.

According to the invention as described above, even in the vehicle having a fuel cell, if any one of the drive wheels slips at the time of the start or acceleration, for example, on a low-$\mu$ road, the traction controller is able to restrict or control the output of the drive wheels, or the rotation of the drive wheels, so as to assure or improve the tractive force of the vehicle, while at the same time assuring improved transverse resistance and stability of the vehicle.

In one preferred form of the invention, the control system as described above may further include a fuel cell output controller configured to control output of the fuel cell during traction control by said traction controller. In this form of the invention, the output of the fuel cell is controlled by the fuel cell output controller during traction control of the traction controller, so that the fuel cell is appropriately operated in accordance with the traction control. For example, immediately after the start of the traction control, the electric motor is initially operated with electric energy supplied from an electric energy storage device, so as to generate assist torque. After a certain period of time, e.g., when the charge amount of the energy storage device falls short, the output of the fuel cell is controlled so that the electric motor is operated with electric energy supplied from the fuel cell. In this manner, the assist drive, or four-wheel drive, can be continued even if the traction control is performed for a prolonged time.

Preferably, the fuel cell output controller may reduce the output of the fuel cell so as to reduce the output of the electric motor during traction control by the traction controller, and, if the output of the electric motor is to be subsequently increased, an electric motor output controller may increase output torque of the electric motor by using electric energy from an electric energy storage device, thus assuring high acceleration response.

In another preferred form of the invention, the vehicle includes a first set of wheels and a second set of wheels, one of said first set and said second set comprising front wheels, the other of said first set and said second set comprising rear wheels, and wherein said first set of wheels are driven by an engine, and said second set of wheels are driven by the electric motor.

In the above form of the invention, the traction controller may reduce output of the engine that drives the first set of wheels so as to perform traction control, and an electric motor output controller may drive the electric motor using electric energy supplied from at least one of an electric energy storage device and the fuel cell, thus assuring improved responsiveness.

Preferably, the four-wheel drive vehicle further includes a generator that is driven by the engine, and the electric motor output controller drives the electric motor that drives the second set of wheels, using electric energy supplied from the generator, and drives the electric motor using electric energy supplied from the fuel cell when electric power generation of the generator is restricted, for example, due to heat generated by the generator. In this manner, the second set of wheels can be driven by the electric motor for a significantly increased period of time, with the electric motor being continuously operated.

In a further preferred form of the invention, the control system may further include a fuel distribution device that distributes fuel to the fuel cell and the engine. Preferably, the fuel distribution device reduces fuel to be supplied to the engine when an amount of fuel remaining in a fuel tank of the vehicle is equal to or less than a predetermined value. Thus, the operation of the engine having a relatively low efficiency is restricted when the remaining amount of the fuel is small, and the highly efficient fuel cell is used for driving the electric motor, thus assuring further improved fuel efficiency.

In another preferred form of the invention, the traction controller may operate to restrict output of the fuel cell when driving of the electric motor is controlled by the output of the fuel cell during traction control. Thus, heat generation of the fuel cell can be advantageously prevented during traction control. During the period of traction control in which the output of the fuel cell is restricted, electric energy is supplied from a generator driven by the engine to the electric motor, and therefore an assist operation by the electric motor is not restricted even if the output of the fuel cell is restricted. Furthermore, the driving force of the first set of wheels is reduced with the load on the engine being increased upon driving of the generator, thus assuring a further improved effect of traction control.

Preferably, the traction controller also performs traction control by operating wheel brakes that apply braking force to wheels of the vehicle. In this case, a high control response can be obtained in traction control by the traction controller.

In another preferred form of the invention, the control system further includes a correcting unit that corrects traction control by the traction controller, based on an operating condition of the fuel cell. In this case, the traction control that matches the power output state of the fuel cell can be performed. For example, as the magnitude of electric energy generated from the fuel cell to the electric motor, i.e., the assist torque generated by the electric motor, increases, reduction or restriction of the drive force (rotation) of the first set of wheels is relaxed, thus making it easy for the vehicle to run in a four-wheel drive mode.

BRIEF DESCRIPTION OF THE DRAWINGS

The foregoing and further objects, features and advantages of the invention will become more apparent from the following description of preferred embodiments with reference to the accompanying drawings, wherein like numerals are used to represent like elements and wherein.

DETAILED DESCRIPTION OF PREFERRED EMBODIMENTS

Presently preferred embodiments of the invention will be described in detail hereinafter with reference to the accompanying drawings.

Figure 1:
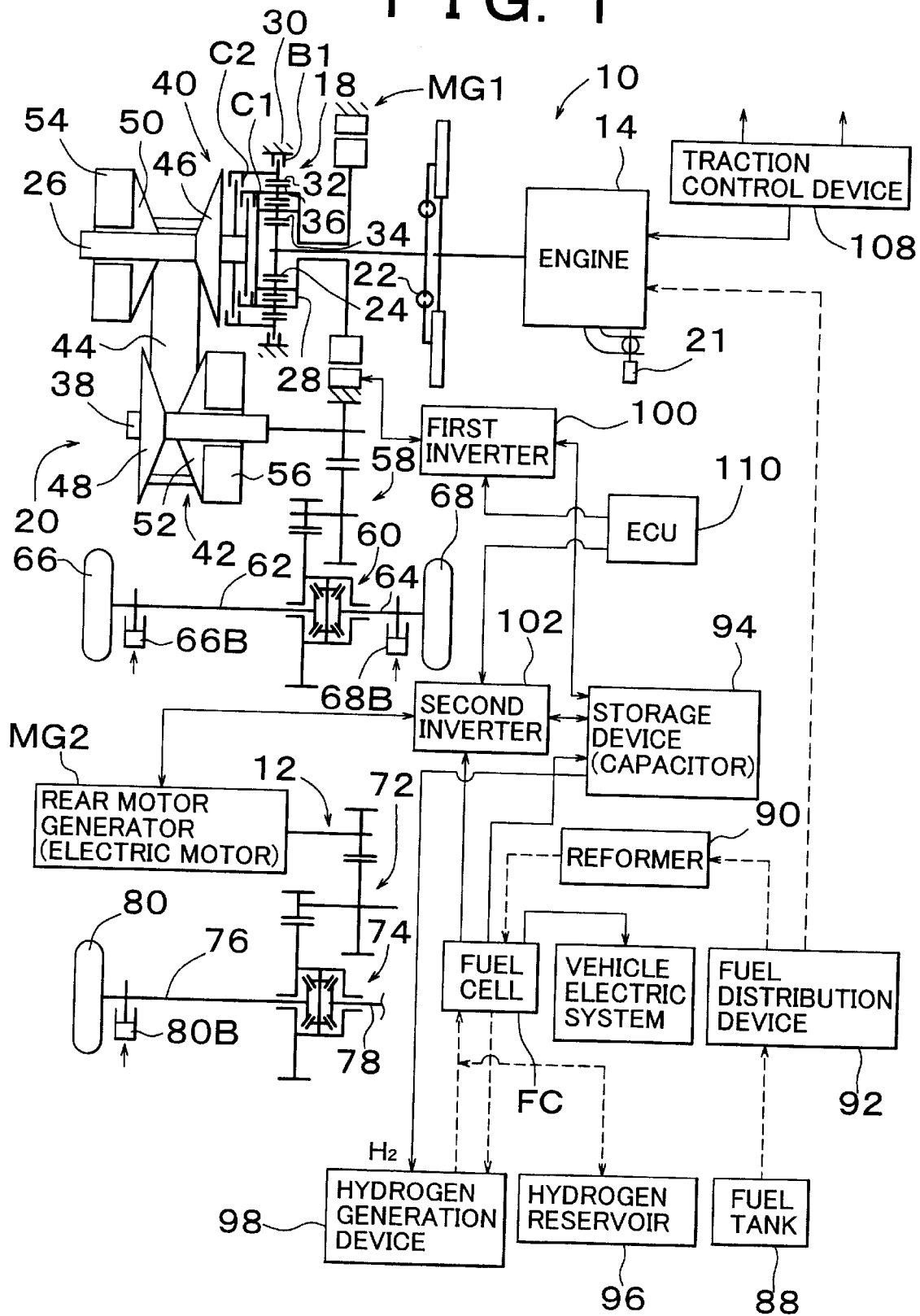
FIG. 1 is a schematic diagram illustrating the construction of a power transmission apparatus of a four-wheel drive vehicle equipped with a control system according to one embodiment of the invention.

FIG. 1 is a schematic diagram illustrating the construction of a power transmission apparatus of a four-wheel drive vehicle, that is, a front-wheel and rear-wheel drive vehicle, to which the invention is applied. The four-wheel drive vehicle of FIG. 1 is a so-called hybrid vehicle having an internal combustion engine and electric motors as driving motors. The four-wheel drive vehicle has a driving arrangement in which a front-wheel drive system is driven by a front-wheel drive unit, i.e., a primary drive unit 10, and a rear-wheel drive system is driven by a rear-wheel drive unit, i.e., a secondary drive unit 12, as shown in FIG. 1.

The primary drive unit 10 has an internal combustion engine 14 that is operated by utilizing combustion of an air-fuel mixture, a motor-generator MG1 (hereinafter, referred to as "MG1") that selectively functions as a first electric motor or a first generator, a double pinion type planetary gear device 18, and a continuously variable transmission 20 capable of continuously changing the speed ratio. These components of the primary drive unit are concentrically arranged on the same axis. The engine 14 serves as a first driving motor, or primary driving motor. The engine 14 is equipped with a throttle actuator 21 for driving a throttle valve that controls the amount of intake air flowing through an intake pipe of the engine 14, in order to change the opening θTH of the throttle valve. The planetary gear device 18 is a force combining/distributing mechanism that mechanically combines or distributes force. The planetary gear device 18 has three rotary elements that are disposed independently rotatably about a common axis, namely, a sun gear 24 connected to the engine 14 via a damper device 22, a carrier 28 connected to an input shaft 26 of the continuously variable transmission 20 via a first clutch C1 and connected to an output shaft of the MG1, and a ring gear 32 connected to the input shaft 26 of the continuously variable transmission 20 via a second clutch C2 and connected to a non-rotational member, for example, a housing 30, via a brake B1. The carrier 28 supports a pair of pinions (planetary gears) 34, 36 that mesh with the sun gear 24 and the ring gear 32 and mesh with each other, such that the pinions 34, 36 are rotatable about their own axes. The first clutch C1, the second clutch C2 and the brake B1 are hydraulic friction devices, each of which is engaged when a plurality of mutually superposed friction plates of the device are pressed against each other by a hydraulic actuator, and is released when the pressure applied to the friction plates is removed.

The planetary gear device 18 and the MG1 connected to the carrier 28 constitute an electric torque converter (ETC). When the engine 14 is being operated (rotated), that is, the sun gear 24 is rotating, with the second clutch C2 being engaged, the ETC controls rotation of the carrier 28 by controlling the reaction force on the carrier 28, i.e., the torque for regeneratively driving or rotating the MG1, so as to cause the MG1 to generate electric power, and also smoothly increase the speed of rotation of the ring gear 32 as an output member from zero to a desired speed. Thus, the vehicle can be smoothly started and accelerated. Assuming that the gear ratio ρ (the number of teeth of the sun gear 24/the number of teeth of the ring gear 32) of the planetary gear device 18 is, for example, an ordinary value of 0.5, the torque of the engine 14 is amplified by 1/ρ times, for example, about 2 times, before it is transmitted to the continuously variable transmission 20, in view of the relationship of the torque of the ring gear 32:the torque of the carrier 28:the torque of the sun gear 24=$1/\rho$:$(1-\rho)/\rho$:1. Thus, the operating mode in which the engine 14 is operating with the clutch C2 being engaged (the ring gear 32 being coupled with the input shaft 26 of the CVT 20) is called "torque amplifying mode". By engaging the first clutch C1, the front wheels 66, 68 can be driven only by the MG1 while the engine 14 is stopped.

The continuously variable transmission 20 includes a pair of variable pulleys 40, 42 having variable effective diameters and provided on the input shaft 26 and an output shaft 38, respectively, and an endless or loop-like transmission belt 44 provided on the pulleys 40, 42. Each of the pulleys 40, 42 has an axially fixed rotary member 46 or 48 fixedly mounted on the input shaft 26 or the output shaft 38, and an axially movable rotary member 50 or 52 which rotates together with the input shaft 26 or the output shaft 38 but is movable in the axial direction relative to the input or output shaft 26, 38. The fixed rotary member 46, 48 cooperates with the corresponding movable rotary member 50, 52 to define a V-shaped groove therebetween. The variable pulleys 40, 42 further include respective hydraulic cylinders 54, 56 which apply thrust force to the appropriate movable rotary member 50, 52 to change the effective diameters of the variable pulleys 40, 42 at which the belt engages with the pulleys, thereby to change the speed ratio $\gamma$(=the speed of rotation of the input shaft/the speed of rotation of the output shaft).

The torque received from the output shaft 38 of the continuously variable transmission 20 is transmitted to the pair of front wheels 66, 58 via a speed reduction gear device 58, a differential gear device 60, and a pair of axles 62, 64. In this embodiment, a steering wheel for changing the steering angle of the front wheels 66, 68 is not illustrated in FIG. 1.

The secondary drive unit 12 includes a rear motor-generator MG2 (hereinafter, referred to as "MG2") that functions as a second electric motor and a second generator. The torque generated by the MG2 is transmitted to a pair of rear wheels 80, 82 via a speed reduction gear device 72, a differential gear device 74, and a pair of axles 76, 78, respectively.

The four-wheel drive vehicle includes a fuel tank 88 for storing liquid fuel, such as gasoline, or LPG, or the like, a fuel cell FC that serves as an electric power source, a reformer 90 that reforms liquid fuel into hydrogen gas to be consumed in the fuel cell FC, a fuel distribution device 92 that distributes liquid fuel from the fuel tank 88 to the engine 14 and the reformer 90, and an electric energy storage device 94, such as a capacitor or a storage battery, for storing electric energy generated by the MG1 or MG2 through regeneration, or electric energy generated by the fuel cell FC. The four-wheel drive vehicle further includes a hydrogen generation device 98 that generates hydrogen by electrolyzing water that is produced by the fuel cell FC with electric energy supplied from the storage device 94, and supplies the thus produced hydrogen to the fuel cell FC or a hydrogen reservoir 96. The vehicle is also provided with a first inverter 100 that controls current supplied and received between the MG1 and the electric energy storage device 94, and a second inverter 102 that controls current supplied and received among the MG2, the storage device 94, and the fuel cell FC.

The four-wheel drive vehicle is further provided with a traction control device 108 and a drive control device 110, as well as an engine drive device, a shift control device and a hybrid control device that are not illustrated in the figures. These control devices are provided by so-called microcomputers each having a CPU, a RAM, a ROM, and an input-output interface. In each control device, the CPU processes input signals and performs various controls in accordance with programs pre-stored in the ROM while using the temporary storage function of the RAM. These control devices are connected to one another for communications among themselves. Thus, when a required signal is requested by one of the control devices, another control device transmits the required signal to the above-indicated one of the control devices.

The traction control device 108 is provided for increasing the vehicle stability or securing and increasing tractive force during a vehicle start or acceleration on a low-$\mu$ road having a low road surface friction coefficient $\mu$, such as a compressed snow road or a frozen road. To this end, the traction control device 108 controls the output of the engine 14 or the MG1 and the braking forces of wheel brakes 66$w$B, 68$w$B, 80$w$B, 82$w$B provided for the respective wheels 66, 68, 80, 82 via hydraulic brake control circuits (not shown), thereby to control the outputs or rotation of the front wheels 66, 68 that serve as drive wheels in this situation. For example, the traction control device 108 calculates wheel vehicle speeds (vehicle body speeds converted from wheel rotational speeds), for example, a front-right wheel vehicle speed $V_{FR}$, a front-left wheel vehicle speed $V_{FL}$, a rear-right wheel vehicle speed $V_{RR}$, a rear-left wheel vehicle speed $V_{RL}$, a front wheel vehicle speed $[=(V_{FR}+V_{FL})/2]$, a rear wheel vehicle speed $[=(V_{RR}+V_{RL})/2]$, and a body vehicle speed (the lowest one of $V_{FR}$, $V_{FL}$, $V_{RR}$ and $V_{RL}$), based on signals from rotation sensors provided on the respective wheels. If the slip speed $\Delta V$ that is a difference between the front wheel vehicle speed based on the front wheels as drive wheels and the rear wheel vehicle speed based on the rear wheels as non-drive wheels exceeds a pre-set control start judgment value $\Delta V1$, the traction control device 108 judges that the front wheel or wheels is/are slipping. In this case, the control device 108 reduces the output torque of the MG1 and reduces the driving forces of the front wheels 66, 68 by use of the wheel brakes 66$w$B, 68$w$B, so as to control the slip rate Rs$[=(\Delta V/V_F)\times 100\%]$ to be less than a pre-set target slip rate Rs1. When the vehicle is running with the MG1 or MG2 operated in accordance with the output from the fuel cell FC, the traction control device 108 restricts or limits the fuel supplied to the fuel cell FC so as to reduce the drive power or rotation of the front wheels 66, 68 or rear wheels 80, 82 that serve as drive wheels. In this manner, the grip force of the drive wheels can be increased, and the vehicle stability and the tractive force can also be increased. Thus, the traction control may be performed by restricting or otherwise controlling the output from the fuel cell FC to the MG1 or the MG2.

The drive control device 110 controls the drive forces of the front wheels 66, 68 and/or the rear wheels 80, 82 in order to switch the vehicle between the two-wheel driving state and the four-wheel driving state. During normal vehicle running, the drive control device 110 causes the vehicle to be driven by using the primary drive unit 10 having the engine 14 and the MG1 for exclusively driving the front wheels 66, 68. For example, the drive control device 110 selects one of pre-set operation modes, based on the current shift-lever position $P_{SH}$, the throttle opening $\theta$ (the degree of throttle valve opening or the operated amount of the accelerator pedal Acc), the vehicle speed V, and the amount of electric energy SOC stored in the storage device 94.

Furthermore, the drive control device 110 selects a torque regenerative braking mode in which braking force is generated by using the torque required for electric power generation of the MG1 or MG2, or an engine brake mode in which braking force is generated by using rotation resistant torque of the engine 14, based on the throttle opening θ and the operated amount of brake pedal BF. The aforementioned operation modes include, for example, a motor driving mode that is selected when the vehicle starts with a relatively low load or is running at a constant speed, a lock-up mode that is selected when the vehicle is running with a medium load or a relatively high load, and an ETC mode. In the motor driving mode, the first clutch C1 is engaged while the second clutch C2 and the brake B1 are both released, so that the vehicle runs only by means of the MG1. In the lock-up mode, the first clutch C1 and the second clutch C2 are both engaged while the brake B1 is released so that the vehicle runs with the engine 1 and the MG1. In the ETC mode, the second clutch C2 is engaged while the first clutch C1 and the brake B1 are both released, and the rotation of the MG1 is controlled (gradually increased) with the MG1 receiving reaction force (the torque for regeneratively driving the MG1), whereby the vehicle is smoothly started from zero velocity while the engine 14 keeps rotating at a certain (i.e., constant) speed. Although the two-wheel driving state is normally selected, the drive control device 110 may also temporarily drive the vehicle in the four-wheel drive state, utilizing assist torque of the MG2. More specifically, high-$\mu$ road assist control is performed when good acceleration or running performance of the vehicle is required, and low-$\mu$ road assist control is performed when the vehicle starting performance is to be enhanced when the vehicle starts running on a low friction coefficient road (low-$\mu$ road) such as a frozen road or a compressed snow road. Under these controls, the drive control device 110 additionally uses the secondary drive unit 12 including the MG2 for exclusively driving the rear wheels 80, 82, and operates the MG2 so as to achieve a drive force distribution ratio corresponding to the load distribution ratio of the front and rear wheels. Thus, the vehicle is temporarily driven in the four-wheel drive state established by the assist torque from the MG2.

Figure 2:
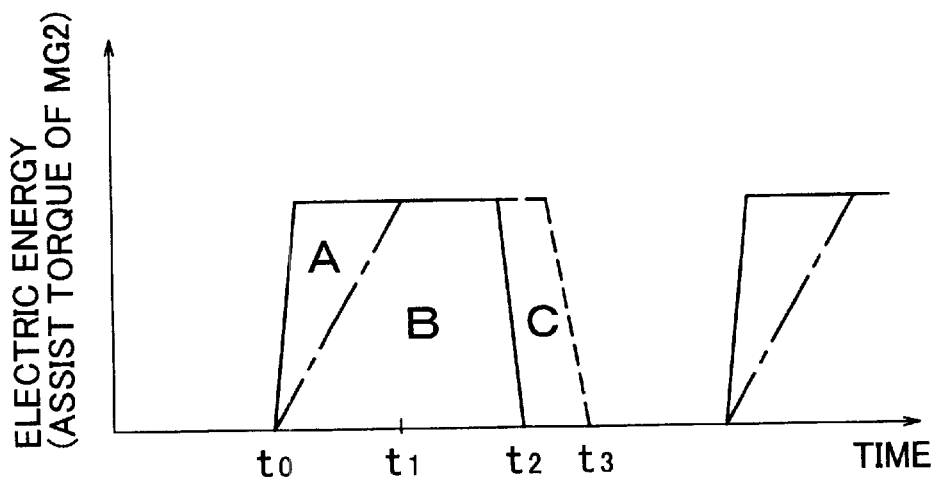
FIG. 2 is a diagram indicating the quantity of electricity supplied from a capacitor or an electric motor MG1 to an electric motor MG2 for assist drive in the vehicle as illustrated in FIG. 1.
Figure 3:
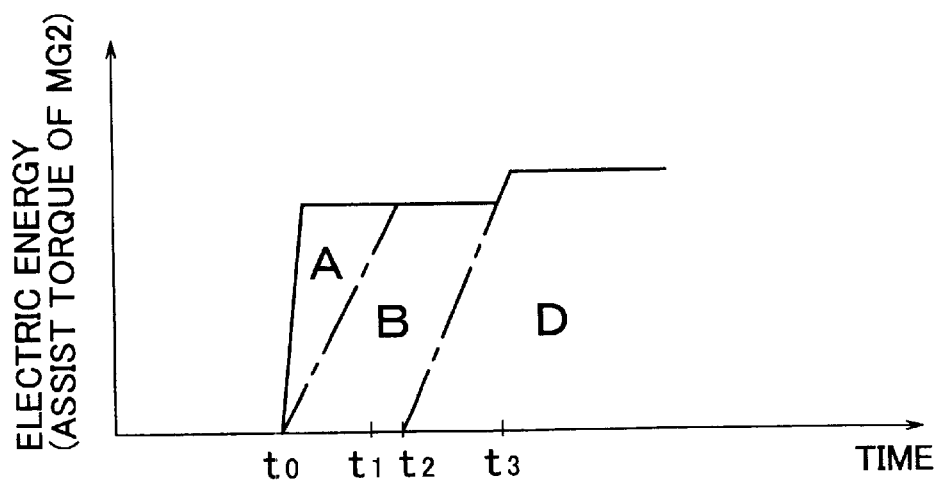
FIG. 3 is a diagram indicating the quantity of electricity supplied from the capacitor, the MG1 or a fuel cell FC to the MG2 for the assist drive in the vehicle illustrated in FIG. 1.

FIGS. 2 and 3 each indicate an example pattern of the assist torque generated from the MG2 or the rear wheels, that is, electric energy (quantity of electricity or electric power) supplied to the MG2, during the assist control. FIG. 2 indicates electric energy supplied where the assist period is relatively short. FIG. 3 indicates electric energy supplied where the assist period is relatively long. In FIGS. 2 and 3, region "A" indicates the quantity of electricity supplied from the electric energy storage device (capacitor) 94 immediately after an assist start point of time $t_0$, and region "B" indicates the quantity of electricity supplied from the MG1 after the assist start point of time $t_0$. After the quantity of electricity supplied from the MG1 increases to a value corresponding to the assist torque, the quantity of electricity supplied from the storage device 94 is reduced to be equal to or lower than a certain value. Thereafter, the MG2 is driven by the electric energy supplied from the MG1 until an assist end point of time $t_2$ is reached. Region C in FIG. 2 indicates the quantity of electricity supplied from the MG1 in order to recharge the storage device 94. Region D in FIG. 3 indicates the quantity of electricity supplied from the fuel cell FC to the MG2. As the quantity of electricity generated from the fuel cell FC rises or increases, the quantity of electricity supplied from the MG1 is reduced. In the meantime, the quantity of electricity generated from the fuel cell FC is increased to a value that is greater by a predetermined value than the quantity of electricity that has been supplied from the MG1.

Furthermore, the drive control device 110 controls the operation of the MG2 in connection with the operating states of the traction control device 108 and the fuel cell FC, as will be described in greater detail.

Figure 4:
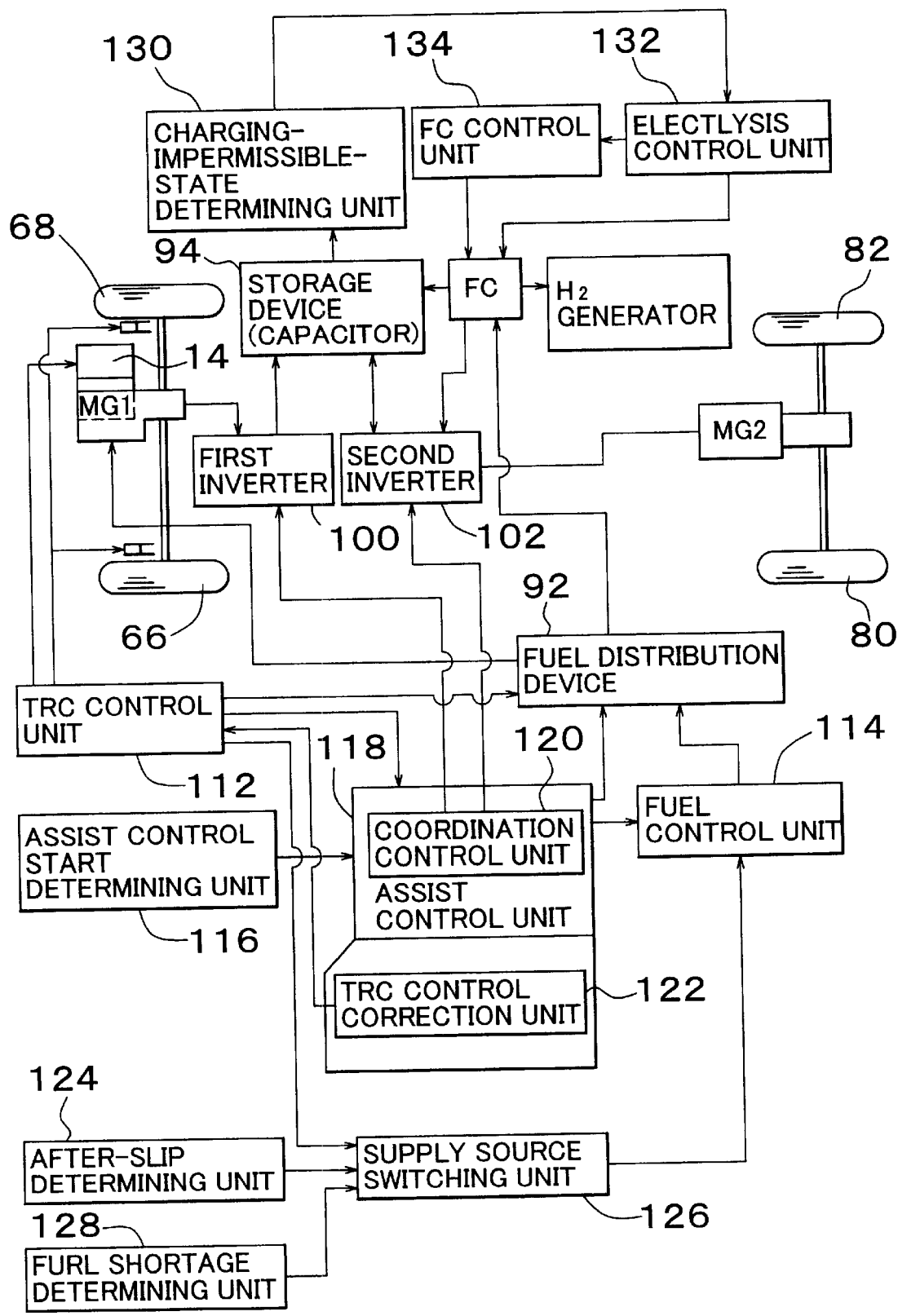
FIG. 4 is a function block diagram illustrating control functions of the control system shown in FIG. 1.

FIG. 4 is a function block diagram illustrating principal portions of control functions of the traction control device 108, the drive control device 110 and others. If a traction control start condition or conditions is/are satisfied, a traction control unit 112 controls the output of the engine 14 or the MG1 and the braking force of the wheel brakes 66*w*B, 68*w*B, 80*w*B, 82*w*B of the wheels 66, 68, 80, 82 via the hydraulic brake control circuit (not shown), so as to restrict or otherwise control the drive forces or rotation of the front wheels 66, 68 as drive wheels. In this manner, the traction control unit 112 improves the vehicle stability and increases the tractive force during vehicle starting or acceleration on a low-$\mu$ road, such as a compressed snow road or a frozen road, having a low road surface friction resistance. Furthermore, when the vehicle is driven with the MG1 or the MG2 operated in accordance with the output from the fuel cell FC, the fuel supplied to the fuel cell FC is limited by a fuel control unit 114 (which will be described later) so that the drive forces or rotation of the drive wheels, that is, the front wheels 66, 68 or the rear wheels 80, 82, are restricted or controlled. This leads to increased grip force of the drive wheels, improved vehicle stability, and increased tractive force. Thus, the traction control is also implemented by limiting the output of the fuel cell FC to the MG1 or the MG2.

The fuel control unit 114 controls the amount of fuel supplied to the engine 14 or the fuel cell FC by controlling the fuel distribution device 92. For example, during the traction control by the traction control device 108, the fuel control unit 114 controls the fuel distribution device 92 so as to reduce the fuel supplied to the engine 14, thereby to reduce the output of the engine 14. If the MG1 is driven by the engine 14 so as to generate electric energy for the assist drive, during the traction control performed by the traction control device 108, the fuel control unit 114 causes the fuel distribution device 92 to supply the engine 14 with compensation fuel to be used for generating torque equivalent to the torque consumed to drive the MG1. When the driving of the MG1 by the engine 14 is stopped, the fuel control unit 114 stops the supply of the compensation fuel. Furthermore, the fuel control unit 114 restricts the output of the fuel cell FC by limiting the fuel supplied to the fuel cell FC, for example, in accordance with a command from the traction control unit 112. In this respect, the fuel control unit 114 also functions as a fuel cell output limiter.

An assist control start determining unit 116 determines whether conditions for starting the assist control are established or satisfied. In the case of a low-$\mu$ road assist control, for example, the unit 116 determines whether the vehicle speed V is equal to or lower than a predetermined value Vx1, whether the accelerator pedal has been operated to accelerate the vehicle, and whether slipping of the front wheels 66, 68 as drive wheels has occurred. An assist control unit 118 functions as an electric motor output control means for controlling the output of the MG2. When the assist control start determining unit 116 determines that the assist control starting conditions are met, the assist control unit 118 additionally uses the secondary drive unit 12 having the MG2 for exclusively driving the rear wheels 80, 82, and operates the MG2 to basically generate assist torque that achieves a drive force distribution ratio corresponding to the front-rear wheel load distribution ratio. Thus, the vehicle is temporarily driven in the four-wheel drive state established by the assist torque from the MG2, for the purpose of enhancing the vehicle accelerating performance, running performance, and the starting capability on a low-$\mu$ road. To this end, immediately after the unit 116 determines that the assist control starting conditions are met, the assist control unit 118 issues a command to cause the MG1 driven by the engine 14, the storage device 94 and the fuel cell FC to supply the MG2 with electric energy for generating the assist torque, and causes the fuel distribution device 92 to supply the engine 14 with compensation fuel for generating torque equivalent to the torque consumed to drive the MG1.

The assist control unit 118 includes a coordination control unit 120 that coordinately controls the output of the electric energy storage device 94 for the assist drive of the vehicle, the power generating operation of the MG1, and the output of the fuel cell FC, and a traction control correction unit 122 for correcting the traction control in accordance with the output from the fuel cell FC to the MG2. The coordination control unit 120 sets power output proportion and power output time of the storage device 94 for a period following the assist control starting point. If the charge amount SOC of the electric energy storage device 94 becomes lower than a set value $SOC_0$, the coordination control unit 120 stops power output from the storage device 94, and continues power output from the MG1. If the elapsed time t following the assist control starting point exceeds a pre-set allowable operation time $t_A$ of the MG1, or if the temperature of the MG1 exceeds a pre-set allowable temperature, the coordination control unit 120 stops power generation of the MG1, and switches to power output from the fuel cell. If there is a request for an increase in the output of the rear wheels 80, 82 in accordance with an acceleration requesting operation performed by a driver, the quantity of electricity generated from the fuel cell FC to the MG2 is increased to a value that is greater by a predetermined value than the quantity of electricity that has been supplied from the MG1. This output state is illustrated in FIG. 3.

The traction control correction unit 122 corrects the traction control performed by the traction control device 108, based on the operating state of the fuel cell FC.

More specifically, when the quantity of electricity supplied from the fuel cell FC to the MG2 is to be increased to be greater by a predetermined value than the quantity that has been supplied from the MG1, the increase in the rotation speed of the front wheels 66, 68, that is, the increase in the vehicle speed, has been restricted by the traction control. In this case, therefore, the traction control correction unit 122 relaxes the restriction of the drive torque or rotation of the front wheels 66, 68 in accordance with the increase in the assist torque from the MG2. This makes it easy to run the vehicle in the four-wheel drive state.

An after-slip determining unit 124 determines whether a slip of a drive wheel(s) has occurred again immediately after the termination of the assist control is determined. Suppose that the after-slip determining unit 124 determines that a slip occurred again after, for example, the assisting operation of the MG2 using the output of the fuel cell FC for the assist control in the four-wheel drive state in which the MG2, or the rear wheels 80, 82, is driven by electric energy from the fuel cell FC. In this case, a supply source switching unit 126 stops the fuel supply from the fuel distribution device 92 to the fuel cell FC to thus stop the supply of electric energy from the fuel cell FC to the MG2, and also starts the supply of electric energy from the MG1 to the MG2, thereby to suppress heat generation of the fuel cell FC.

A fuel shortage determining unit 128 determines whether the remaining amount of fuel, such as a liquid fuel or a gaseous fuel, in the fuel tank 88 has decreased to be less than a shortage judgment value, based on a signal from a level sensor (not shown). Suppose that the fuel shortage determining unit 128 determines that the remaining amount of fuel, such as a liquid fuel or a gaseous fuel, in the fuel tank 88 has decreased to be less than the shortage judgment value in a rear wheel drive state, for example, a four-wheel drive state, in which the rear wheels 80, 82 are driven with electric energy supplied from the MG1 driven by the engine 14 to the MG2. In this case, the supply source switching unit 126 stops driving of the MG1 by the engine 14, and at the same time starts supply of fuel from the fuel distribution device 92 to the fuel cell FC so as to supply electric energy from the fuel cell FC to the MG2, thereby continuing the rear wheel drive state or the four-wheel drive state.

A charging-impermissible-state determining unit 130 determines whether the storage device 94 is in a charging-impermissible state in which, for example, the remaining charge amount SOC is greater than a pre-set value $SOC_0$. An electrolysis control unit 132 electrolyzes water discharged from the fuel cell FC or water discharged from an air conditioner (not shown) during, for example, dehumidification, using electric energy obtained through regeneration, and supplies the resultant hydrogen to the fuel cell FC in operation via a fuel cell control unit 134 or to the hydrogen reservoir 96 for storing hydrogen. When the hydrogen reservoir 96 becomes filled with hydrogen, electric energy generated by the fuel cell FC using redundant hydrogen is supplied to an electric actuator of an electric braking system (not shown), an electric PS (power steering), or vehicle drive system, any of which operates coordinately at this time.

Figure 5:
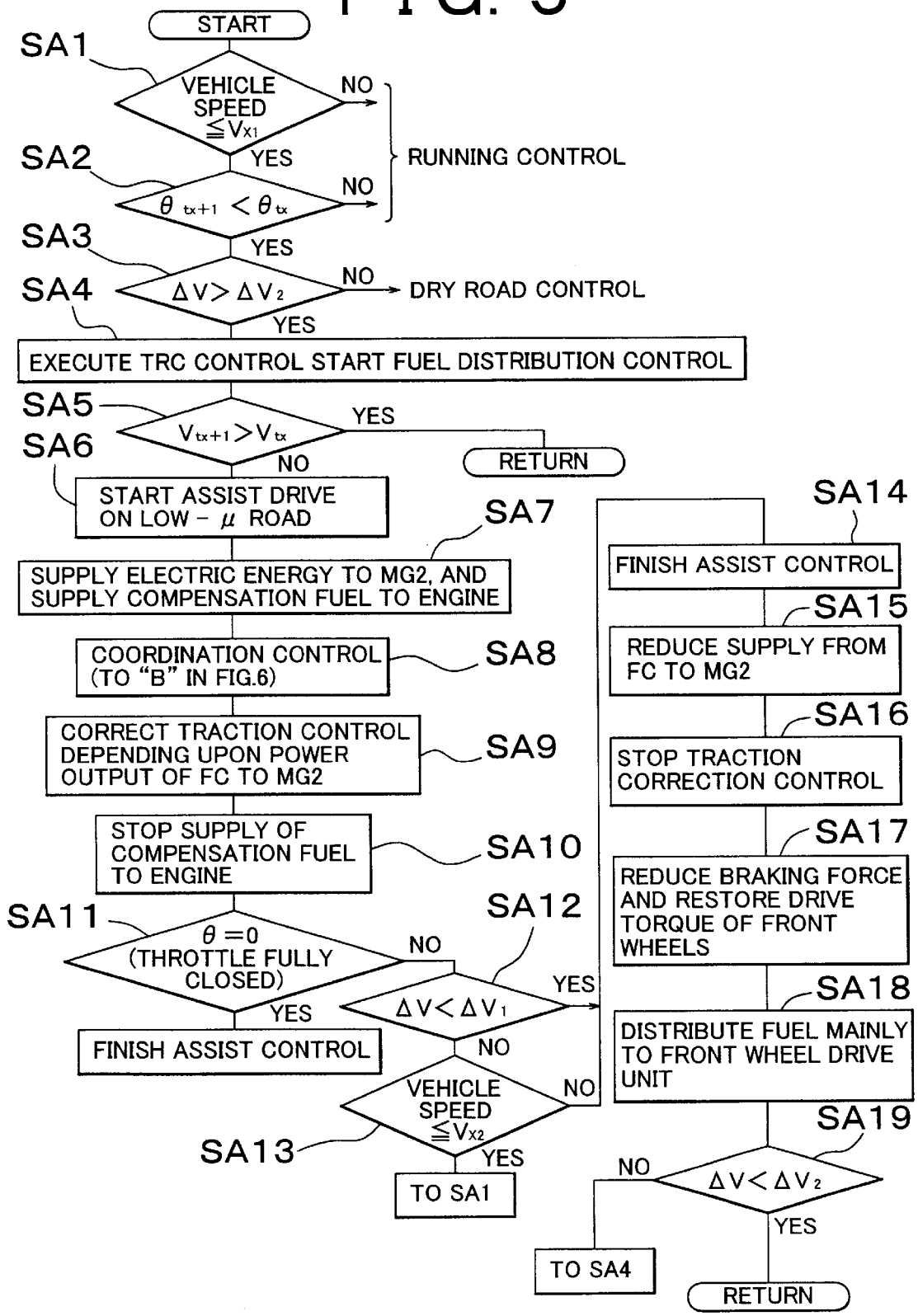
FIG. 5 is s a flowchart useful for explaining control operations of the control system of FIG. 1, which flowchart illustrates an assist control routine.
Figure 6:
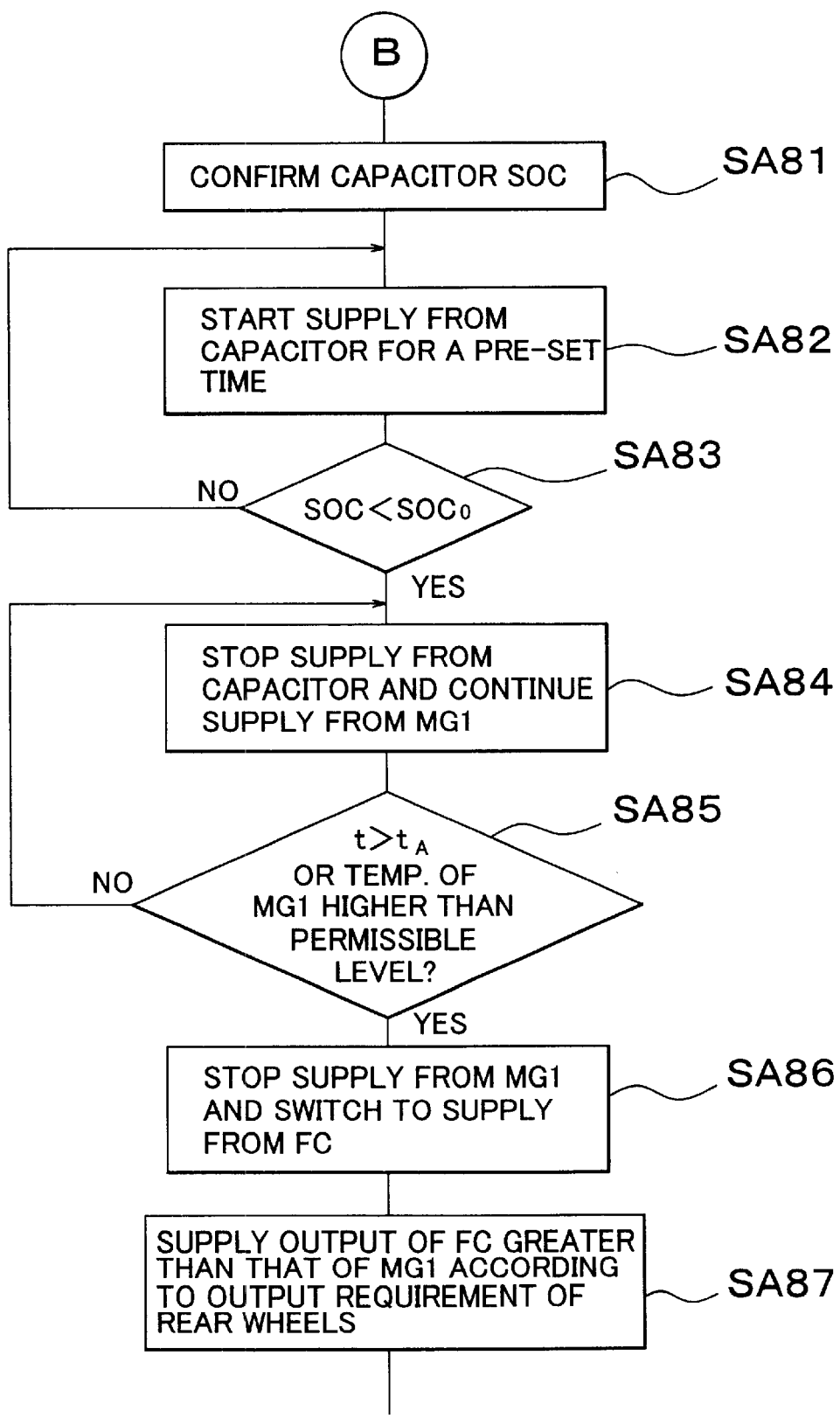
FIG. 6 is a flowchart of a routine illustrating a coordination control operation of step SA8 in the flowchart of FIG. 5.

FIG. 5 is a flowchart illustrating a principal portion of the control operations performed by the drive control device 110 and the like. The flowchart of FIG. 5 illustrates a routine of assist control for the vehicle running on a low-$\mu$ road. FIG. 6 illustrates a coordination control routine included in the flowchart of FIG. 5.

In step SA1 of FIG. 5, it is determined whether the vehicle speed V is equal to or lower than a predetermined value V×1. If an affirmative decision (YES) is obtained in step SA1, step SA2 is executed to determine whether a certain degree or more of an accelerating operation has been performed, based on whether the operated amount θ of the accelerator pedal has increased. If an affirmative decision (YES) is obtained in step SA2, step SA3 is then executed to determine whether slipping of the drive wheels, or the front wheels 66, 68 during normal running, has occurred, based on whether the slip speed ΔV has exceeded a predetermined value ΔV2. If a negative decision (NO) is obtained in any one of steps SA1, SA2 and SA3, running control (not illustrated) for normal running is executed. Conversely, if affirmative decisions (YES) are obtained in all of steps SA1, SA2 and SA3, the traction control for restricting rotation or drive force of the front wheels 66, 68 is performed in step SA4 corresponding to the traction control unit 112. That is, steps SA1, SA2 and SA3 correspond to a means for determining that the traction control starting conditions are established or satisfied. Under the traction control, the output torque of the engine 14 or the MG1 is reduced so that the slip rate Rs of the front wheels 66, 68 [=(ΔV/$V_F$)×100%] becomes equal to or smaller than a pre-set target slip rate Rs1, and at the same time the drive forces of the front wheels 66, 68 are reduced by the wheel brakes 66wB, 68wB. In order to increase the effect of the traction control, the output torque of the engine 14 is reduced by reducing the amount of fuel distributed to the engine 14 by the fuel distribution device 92.

Subsequently, step SA5 is executed to determine whether the traction control has yielded a satisfactory effect, that is, whether the vehicle speed V has increased as a result of increases in the tractive force and the grip forces of the front wheels 66, 68 due to the traction control. If an affirmative decision (YES) is obtained in step SA5, the assist control in step SA6 and subsequent steps is avoided, and another control routine is executed instead. Thus, steps SA1, SA2, SA3 and SA5 correspond to the assist control start determining unit 116 for determining whether the conditions for starting the low-$\mu$ road assist control are established.

If a negative decision (NO) is obtained in step SA5, the low-$\mu$ road assist control is started in step SA6. The low-$\mu$ road assist control is performed to drive the MG2 in order to generate drive forces of the rear wheels 80, 82 within a relatively short time, for example, several seconds. The torque generated by the control has a basic magnitude or value corresponding to the front-rear wheel load distribution. However, the basic value may be changed by changing the gain in accordance with, for example, the gradient of a slope of the road.

Subsequently, step SA7 is executed to generate a command to cause the MG1 driven by the engine 14, the electric energy storage device 94 and the fuel cell FC to output electric energy for generating the assist torque to the MG2. Furthermore, compensation fuel for generating torque equivalent to the torque consumed to drive the MG1 is supplied from the fuel distribution device 92 to the engine 14. Thus, step SA7 also corresponds to the fuel control unit 114.

In step SA8 corresponding to the coordination control unit 120, a quantity of electricity as indicated in FIG. 3 is generated by combining the operations of the MG1, the storage device 94 and the fuel cell FC, so that the MG2 outputs the required assist torque. That is, as illustrated in the flowchart of the coordination control routine in FIG. 6, a power output proportion and a power output time of the storage device 94 (capacitor) are set in steps SA81 and SA82 following the assist control starting point. If the charge amount SOC of the storage device 94 falls below a set value $SOC_0$, the electric power output from the storage device 94 is stopped and the power output from the MG1 is continued (steps SA83, SA84). If the elapsed time "t" following the assist control starting point exceeds a pre-set allowable operation time $t_A$ of the MG1, or if the temperature of the MG1 exceeds a pre-set allowable temperature, the power generation of the MG1 is stopped and the power supply is switched to that from the fuel cell FC (steps SA85, SA86). Furthermore, if there is a request for an increase in the output of the rear wheels 80, 82 as the demand for acceleration by the driver increases, for example, during driving on an uphill road or the like, the quantity of electricity generated from the fuel cell FC to the MG2 is increased to be greater by a predetermined value than the quantity that has been supplied from the MG1 (step SA87).

Subsequently, in step SA9 (FIG. 5) corresponding to the traction control correction unit 122, the restriction or reduction of the drive torque or rotation of the front wheels 66, 68 is relaxed or attenuated in accordance with the increase in the assist torque from the MG2 so as to facilitate vehicle running in the four-wheel drive state, where the quantity of electricity generated from the fuel cell FC to the MG2 is increased to be greater by the predetermined value than the quantity previously supplied from the MG1. In step SA10 corresponding to the fuel control unit 114, if the power generation of the MG1 is stopped in step SA8, the supply of compensation fuel to the engine 14 for the purpose of additionally generating the torque needed for the power generation of the MG1 is stopped by the fuel distribution device 92.

Subsequently, steps SA11, SA12 and SA13 are executed to determine whether assist control ending conditions are satisfied. If the operated amount $\theta$ of the accelerator pedal is zero, namely, if the throttle valve is in a completely closed state, an affirmative decision (YES) is obtained in step SA11, and the assist control is finished, followed by another control. Even where step SA11 determines that the operated amount $\theta$ of the accelerator pedal is not equal to zero ("NO" in step SA1), a command to finish the assist control is generated in step SA14 if step SA12 determines that the slip speed $\Delta V$ is less than the predetermined $\Delta V1$ or step SA13 determines that the vehicle speed V is maintained above a certain value Vx2. However, if the slip speed $\Delta V$ is equal to or higher than the predetermined value $\Delta V1$ (where $\Delta V1 \leq \Delta V2$)(SA12) and the vehicle speed V is not maintained above a certain value Vx2 (SA13), step SA1 and subsequent steps are repeatedly executed so as to continue the low-$\mu$ road assist control.

In step SA15 subsequent to step SA14, the supply of electric energy from the fuel cell FC to the MG2 is reduced. In step SA16, a command to stop the traction correction control is generated to the traction control device 108. In step SA17, the brake forces of the front wheel brakes 66B, 68B are reduced thereby to restore the drive torque of the front wheels 66, 68. In step SA18, the fuel distribution is shifted toward the front-wheel side in order to establish two-wheel drive, and the supply of fuel to the fuel cell FC is stopped. Step SA19 is then executed to determine whether the drive wheels, or the front wheels 66, 68, do not slip any longer, based on whether the slip speed $\Delta V$ has become less than the predetermined value $\Delta V2$. If a negative decision (NO) is obtained in step SA19, the process starting from step SA4 is repeated. Conversely, if an affirmative decision (YES) is obtained in step SA19, another control, such as high-$\mu$ road assist control, is executed.

Figure 7:
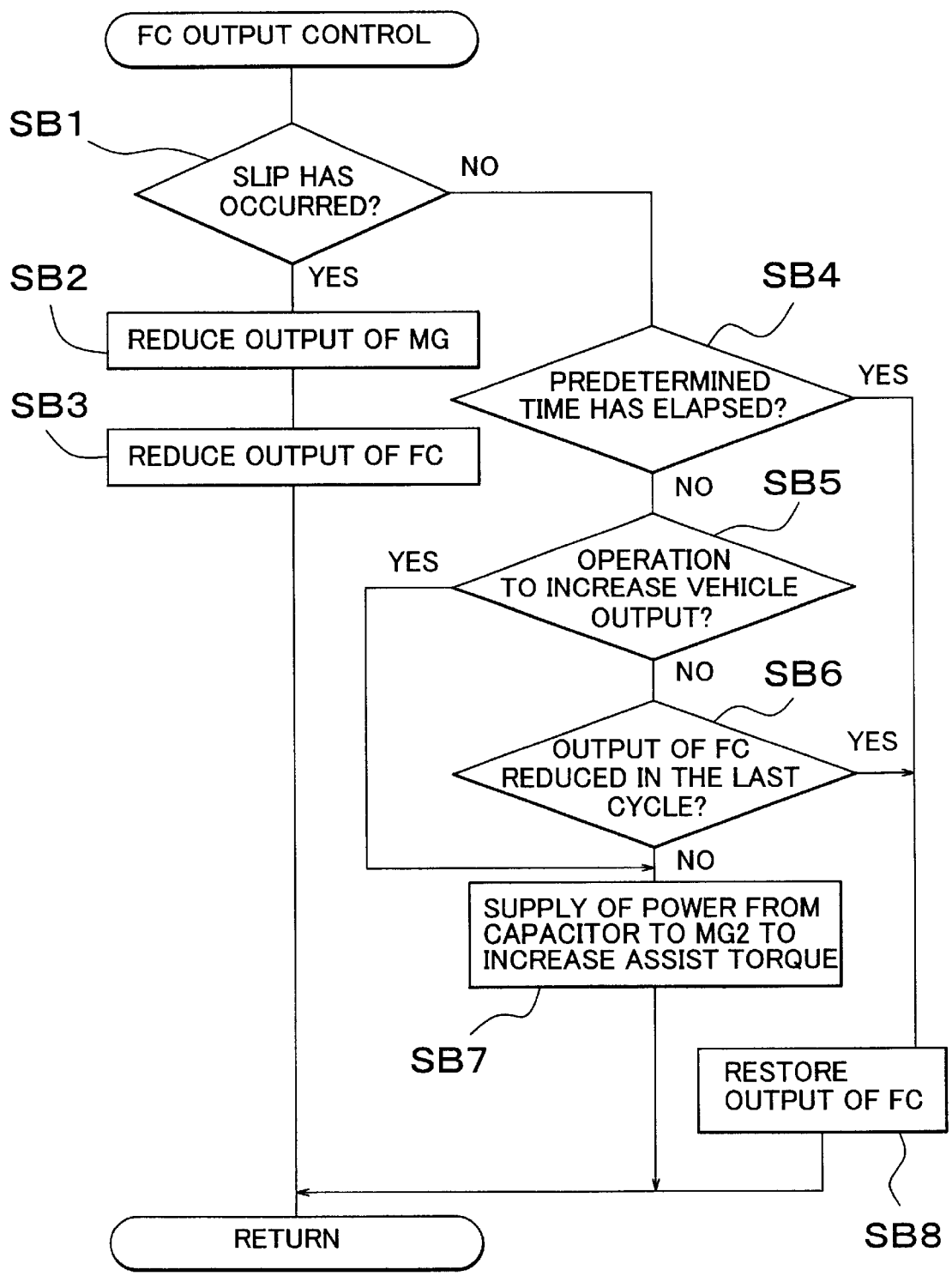
FIG. 7 is a flowchart illustrating another operation of the control system shown in FIG. 1.

FIG. 7 illustrates a fuel cell output control routine that is executed independently of or simultaneously with the above-described control. In step SB1 of FIG. 7, it is determined whether the drive wheels, i.e., the front wheels 66, 68 or the rear wheels 80, 82, driven by the MG1 or the MG2 have slipped, for example, on a low-$\mu$ road, while the vehicle is driven by the MG1 or the MG2 to which the output of the fuel cell FC is supplied. If no slipping occurs from the beginning, for example, with the vehicle running on a dry road, a negative decision (NO) is obtained in step SB1, and negative decisions (NO) are obtained in steps SB4 and SB5, which are followed by step SB6 in which an affirmative decision (YES) is obtained. The control flow then goes to step SB8 in which the output of the fuel cell FC is maintained. However, if slipping occurs due to, for example, driving on a low-$\mu$ road, and an affirmative decision (YES) is obtained in step SB1, the control flow goes to step SB2 corresponding to the traction control unit 112. In step SB2, the amount of electric energy supplied from the fuel cell FC to the MG1 or the MG2 is limited, thereby to reduce or prevent slipping of the front wheels 66, 68 or the rear wheels 80, 82, thus assuring sufficient tractive force and improved stability of the vehicle. Subsequently in SB3 corresponding to the fuel control unit 114, the amount of fuel supplied to the fuel cell FC is limited so as to reduce the output of the fuel cell FC.

If a negative decision (NO) is obtained in step SB1 while the above-described routine is repeatedly executed, step SB4 determines whether the elapsed time following the reduction in the output of the MG1 or the MG2 in step SB2 has reached or exceeded a predetermined length of time. The predetermined length of time is the maximum period of time during which the operation of the traction control in step SB2 is permissible. In a number of control cycles immediately after the end of slipping, a negative decision (NO) is obtained in step SB4, and step SB5 is executed to determine whether the operation to increase the vehicle output has been performed, on the basis of, for example, a change in the operated amount θ of the accelerator pedal. If the vehicle output increasing operation is not performed, a negative decision (NO) is obtained in step SB5, and step SB6 determines that the output of the fuel cell FC was reduced in the previous cycle. Step SB8 is then executed to restore the output of the fuel cell FC to the original value, or the normal output value provided before occurrence of slipping.

If the vehicle output increasing operation is performed, on the other hand, an affirmative decision is (YES) obtained in step SB5, and the control flow goes to step SB7 corresponding to the supply source switching unit 126. In step SB7, the output of the electric energy storage device (capacitor) 94 is immediately supplied to the MG1 or the MG2, thereby quickly increasing the vehicle drive force. For example, if the output of the storage device 94 is supplied to the MG2, the assist torque is quickly increased, thus assuring improved acceleration responsiveness. Then, when the predetermined length of time elapses, an affirmative decision (YES) is obtained in step SB4, and the control flow goes to step SB8 in which the output of the fuel cell FC is restored to the original value, or the normal output value provided before occurrence of slipping.

In the present embodiment, where the above-indicated traction control starting conditions are satisfied, the traction control device 108 or the traction control unit 112 is adapted to restrict or reduce the rotation or drive forces of the front wheels 66, 68 such that the front wheels 66, 68 grip the road surface, for example, such that the slip rate Rs of the front wheels 66, 68 $[=(\Delta V/V_F)\times 100\%]$ becomes equal to or smaller than the pre-set target slip rate Rs1, in order to increase the tractive force of the vehicle. During starting or acceleration of the vehicle even having the fuel cell FC, for example, on a low-$\mu$ road, the traction control device 108 controls the slip rate Rs of the front wheels 66, 68 to be equal to or smaller than the target slip rate Rs1 so as to secure (increase) vehicle tractive force, and also increases transverse resistance for improved vehicle stability.

Also, according to this embodiment, the fuel (battery output) control unit 114 is further provided for controlling the output of the fuel cell FC during the traction control performed by the traction control unit 112. During the traction control of the traction control unit 112, therefore, the output of the fuel cell FC is controlled by the fuel (battery output) control unit 114, so that the fuel cell FC is appropriately operated in accordance with the traction control. For example, immediately after the traction control starts, the MG2 is immediately operated by electric energy supplied from the storage device 94 in order to generate the assist torque. After a certain period of time, for example, when the remaining charge amount SOC of the storage device 94 becomes short, the output of the fuel cell FC is controlled so that the MG2 is operated by electric energy generated by the fuel cell FC. Therefore, even if the traction control continues for a prolonged period of time, the assist drive, i.e., the four-wheel drive, is continuously performed.

Preferably, the fuel control (battery output) unit 114 is adapted to reduce the output of the fuel cell FC in order to reduce the output of the MG2 during the traction control performed by the traction control unit 112. If the output of the MG2 is subsequently to be increased, the assist control unit (electric motor output control unit) 118 is adapted to increase the output torque of the MG2 by using electric energy from the storage device 94. Thus, the output of the fuel cell FC is reduced by means of the fuel (battery output) control unit 114 at the start of the traction control, and, if the output of the MG2 is subsequently to be increased, the assist control unit (electric motor output control unit) 118 operates to increase the output of the MG2 using electric energy from the storage device 94, thus assuring high acceleration responsiveness.

In the present embodiment, the vehicle is a four-wheel drive vehicle or a front- and rear-wheel drive vehicle, in which the engine 14 functions as a driving motor to drive the front wheels 66, 68, and the MG2 functions as an electric motor to drive the rear wheels 80, 82. With this type of four-wheel drive vehicle provided with the traction control device 108, the traction control or assist control suitable for dealing with slipping of the front wheels 66, 68 as drive wheels can be achieved, to provide improved vehicle stability.

According to this embodiment, the traction control device 108 reduces the output of the driving motor for driving the front or rear wheels in order to perform the traction control. The assist control unit (electric motor output control unit) 118 drives the MG2 for driving the rear wheels 80, 82 by electric energy from the fuel cell FC and the storage device 94. Thus, in the four-wheel drive vehicle equipped with the traction control device, the MG2 for driving the rear wheels 80, 82 is operated with improved responsiveness, using electric energy from the storage device 94 and the fuel cell FC.

Furthermore, in the present embodiment, the front- and rear-wheel drive vehicle includes the MG1 (generator) driven by the engine 14. The MG2 for driving the rear wheels 80, 82 is driven by electric energy generated by the MG1. If the power generation of the MG1 is limited due to heat generated by the MG1, or for another reason, the MG2 is driven by electric energy from the fuel cell FC. Therefore, the assist drive of the rear wheels 80, 82 by use of the MG2 may continue for a practically unlimited period of time, while the MG2 keeps operating.

Still further, according to the embodiment, the fuel distribution device 92 is provided for distributing fuel to the fuel cell FC and the engine 14. The fuel distribution device 92 is controlled during the traction control performed by the traction control device 108. Therefore, since the fuel distribution device 92 for distributing fuel to the fuel cell FC and the engine 14 is controlled during the traction control or the assist control, the traction control device 108 suitably performs the traction control or the assist control for the four-wheel drive, utilizing the control of fuel distribution. If the fuel distributed to the engine 14 is reduced in order to provide an effect of the traction control, the braking force required from the front wheels 66, 68 is reduced or eliminated. Therefore, the fuel loss is reduced as compared with the case where the traction control relies solely on the brakes 66B, 68B.

Moreover, in the present embodiment, the traction control device 108 performs the traction control by operating the front wheel brakes 66B, 68B for applying braking force to the front wheels 66, 68, and thus reducing the rotation of the front wheels 66, 68. Thus, a high control response can be obtained in the traction control performed by the traction control device 108.

According to this embodiment, the traction control correction unit 122 is further provided for correcting the traction control by the traction control device 108, based on the operating state of the fuel cell FC. Since the traction control is corrected based on the operating state of the fuel cell FC, the traction control suited for the power output state of the fuel cell FC can be advantageously performed. For example, as the magnitude of electric energy supplied from the fuel cell FC to the MG2, in other words, the assist torque produced by the MG2, increases, the restriction or reduction of the drive forces (rotation) of the front wheels 66, 68 caused by the traction control is relaxed or attenuated, thereby further facilitating the four-wheel driving of the vehicle.

Still further, according to the embodiment, during running of the vehicle in which the MG1 or the MG2 is driven/controlled by the output of the fuel cell FC, the output from the fuel cell FC to the MG1 or MG2 is limited so as to restrict slipping of the drive wheel(s) under the traction control (traction control unit 112, SB2). When the output of the vehicle is subsequently to be increased, electric power is supplied from the electric energy storage device 94 to the MG1 or the MG2 (supply source switching unit 126, SB7), and then the output of the fuel cell FC, which is relatively slow in rising or starting, is supplied (SB8). Accordingly, desirable vehicle start and acceleration responsiveness can be achieved.

Other embodiments of the invention will next be described. In the following description, the same reference numerals as used in the above embodiment will be used for identifying corresponding elements or portions, of which no detailed description will be provided.

Figure 8:
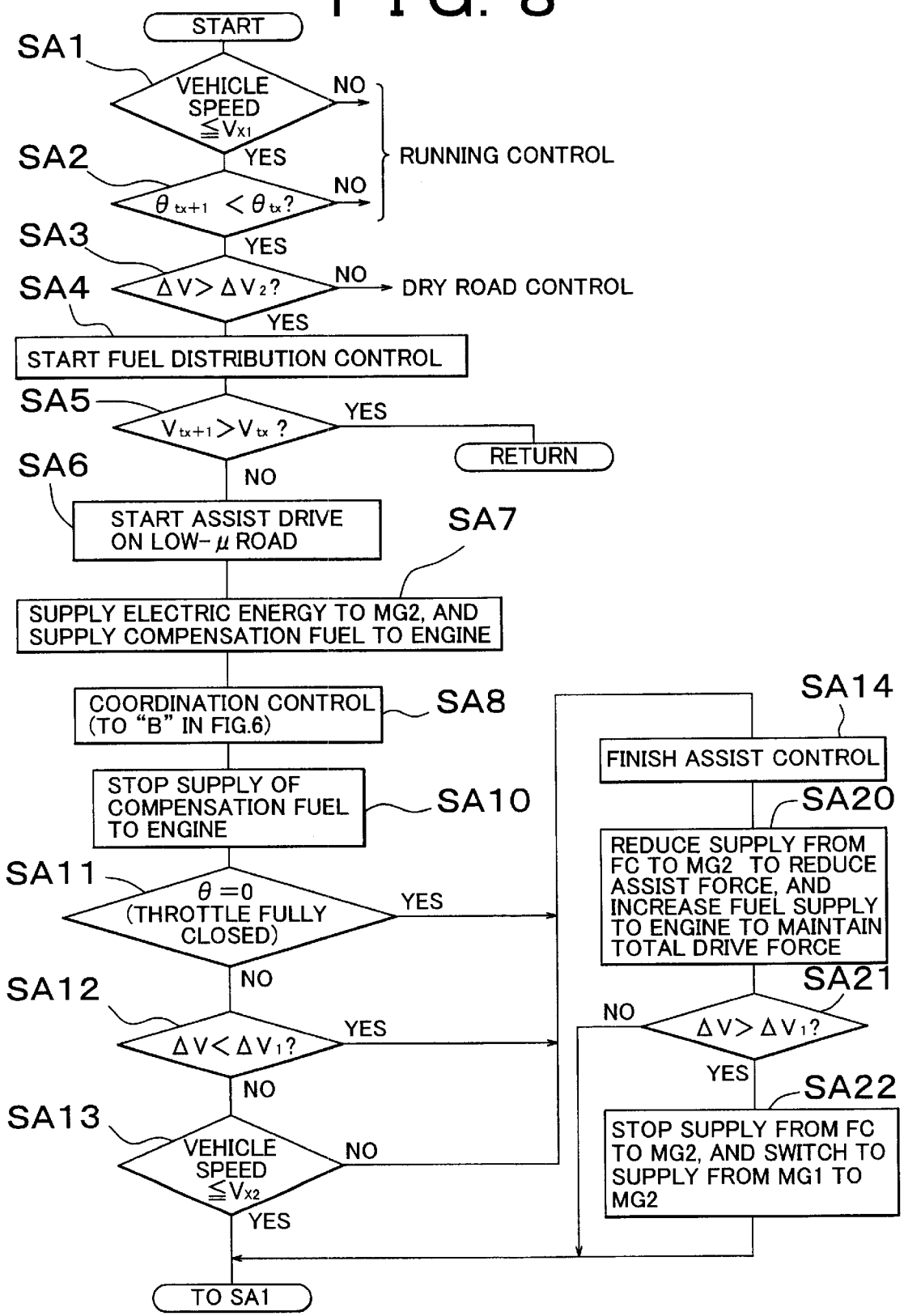
FIG. 8, corresponding to FIG. 5, is a flowchart illustrating control operations according to another embodiment of the invention.
Figure 9:
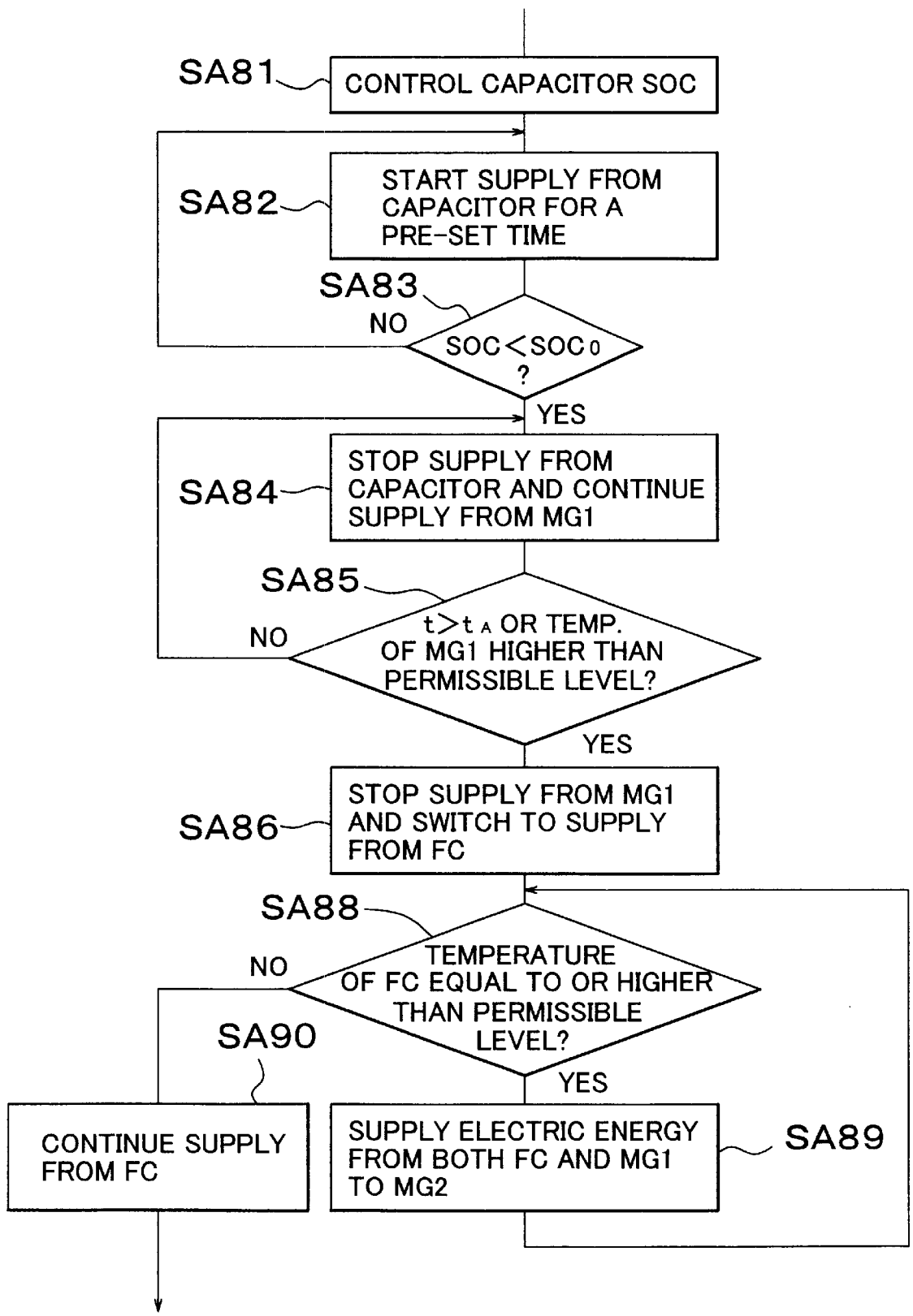
FIG. 9, corresponding to FIG. 6, is a flowchart of a routine illustrating a coordination control operation of step SA 8 in FIG. 8.

FIGS. 8 and 9 are flowcharts illustrating control routines that may replace the assist control routine of FIG. 5 and the coordination control routine of FIG. 6. The assist control routine of FIG. 8 differs from the assist control routine of FIG. 5 in that step SA9 is eliminated, and steps SA15 to SA19 are replaced by steps SA20 to SA22. The routine of FIG. 9 differs from the routine of FIG. 6 in that step SA87 is replaced by steps SA88 to SA90. These differences will be mainly described below.

In SA4 in FIG. 8 corresponding to the traction control unit 112, the amount of fuel distributed to the engine 14 under the fuel distribution control performed by the fuel distribution device 92 is reduced so as to reduce the output torque of the engine 14, thereby restricting or reducing the rotation of the drive wheels, or the MG1. In the coordination control of step SA8 as illustrated in FIG. 9, it is determined in SA88 whether the actual temperature of the fuel cell FC has become equal to or higher than a pre-set allowable temperature, based on a signal from a temperature sensor (not shown). If an affirmative decision is obtained in step SA88, the control flow goes to step SA89. In SA89, in order to reduce the loads of the fuel cell FC and the MG1, the MG1, which functions as a generator, is now used to supply a portion of the amount of electric energy that has been supplied to the MG2 solely from the fuel cell FC so far, to the MG2, so that the four-wheel drive is continued. Conversely, if a negative decision (NO) is obtained in step SA88, the control flow goes to step SA90, the MG2 continues to be supplied with electric energy solely from the fuel cell FC while the supply from the MG1 is kept stopped.

In step SA20 of FIG. 8 that is executed after a command to finish the assist control is generated, the amount of electric energy supplied from the fuel cell FC to the MG2, namely, the assist torque of the MG2 (drive forces of the rear wheels 80, 82), is gradually reduced. While the assist torque is thus being reduced, the fuel supplied to the engine 14 is increased to increase the drive forces of the front wheels 66, 68 so that the drive force of the entire vehicle is maintained. Subsequently, step SA21 corresponding to the after-slip determining unit 124 determines whether slipping of the front wheels 66, 68 as the drive wheels has occurred immediately after the assist control. If a negative decision (NO) is obtained in step SA21, step SA1 and subsequent steps are repeatedly executed. Conversely, if an affirmative decision (YES) is obtained in step SA21, the control flow goes to step SA22 corresponding to the supply source switching unit 126. In step SA22, the output of electric energy from the fuel cell FC to the MG2 is stopped so as to suppress heat generation of the fuel cell, and the source of supplying electric energy to the MG2 is switched to the MG1, while the assist torque generated from the MG2 is gradually reduced.

As described above, this embodiment provides substantially the same effects or advantages as provided by the previous embodiment. Furthermore, if the traction control is performed due to recurrence of slipping while the vehicle is running in the four-wheel drive mode with the MG2 driven by the output of the fuel cell FC under the traction control, the supply from the fuel cell FC to the MG2 is limited, and therefore heat generation of the fuel cell FC is suitably prevented. During the period of the traction control in which the output of the fuel cell FC is limited, the MG2 is supplied with electric energy generated by the MG1 driven by the engine 14. Therefore, despite the limitation on the output of the fuel cell FC, the assist operation performed by the MG2 is not limited. As the load on the engine 14 increases due to the driving of the MG1, the drive forces of the front wheels 66, 68 decrease, resulting in a further improvement in the traction control effect.

Figure 10:
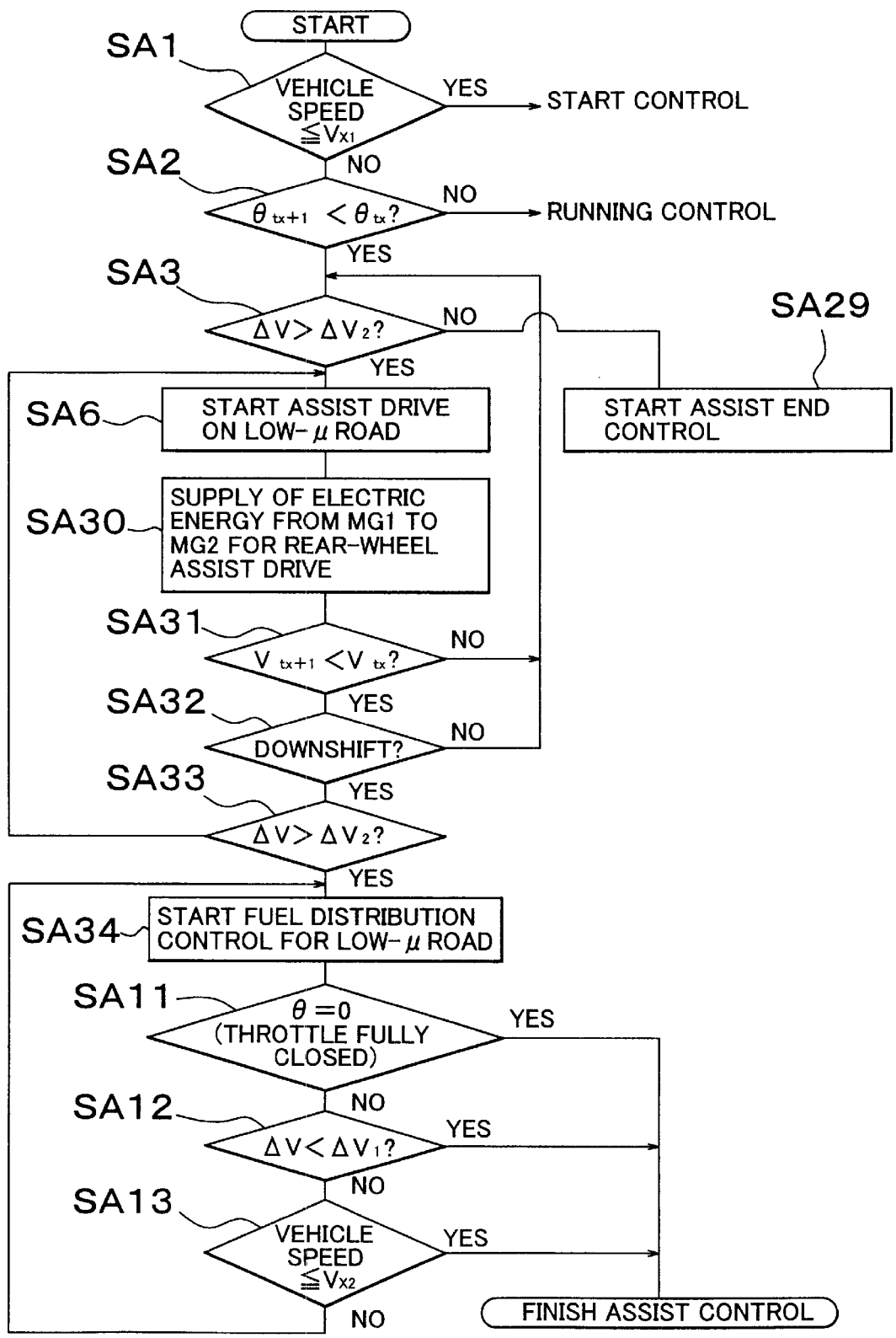
FIG. 10, corresponding to FIG. 5, is a flowchart illustrating control operations according to still another embodiment of the invention.

FIG. 10 illustrates a control routine that may replace the assist control routine illustrated in FIG. 5. The assist control routine of FIG. 10 is intended to provide assist control at the time of slipping of the front wheels 66, 68 caused by an accelerating operation during vehicle running. The routine of FIG. 10 differs from the routine of FIG. 5 in that steps SA4, SA5, SA7 to SA10, and SA15 to SA19 are eliminated, and steps SA29 to SA34 are provided. These differences will be mainly described below.

Referring to FIG. 10, after the low-$\mu$ road assist control is started in step SA6, electric energy is supplied from the MG1 driven by the engine 14 to the MG2 so that the rear wheels 80, 82 generate assist torque in step SA30 corresponding to the traction control unit 112. As a result, the vehicle is brought into a four-wheel drive running state. In this state, since a part of the output torque of the engine 14 is consumed to drive the MG1, the torque for driving the front wheels 66, 68 is accordingly reduced, and the rotation of the front wheels 66, 68 is restricted. Thus, substantial traction control is implemented. Subsequently, step SA31 determines whether the vehicle speed has increased, as in step SA5.

If a negative decision (NO) is obtained in step SA31, the rear wheel assist running is continued by repeatedly executing step SA3 and subsequent steps. Conversely, if an affirmative decision (YES) is obtained in step SA31, the vehicle has increased due to the effect of the traction control. In the next step SA32, therefore, it is determined whether a downshift command has been generated or executed in response to an accelerating operation during vehicle running. If a negative decision (NO) is obtained in step SA32, the assist control is continued by repeatedly executing step SA3 and subsequent steps. Conversely, if an affirmative decision (YES) is obtained in step SA32, that is, if a downshift command has been generated or executed, step SA33 is then executed to determine whether slipping of the drive wheels has occurred, as in step SA3. If a negative decision (NO) is obtained in step SA33, the assist control is continued by executing step SA6 and subsequent steps.

Conversely, if an affirmative decision (YES) is obtained in step SA33, it means that slipping has occurred due to a power-on downshift. In the next step SA34 corresponding to the traction control unit 112, the assist (traction control) performed by use of electric energy supplied from the MG1 to the MG2 is stopped, and the drive force distribution control is executed based only on fuel distribution. That is, since the accelerator pedal has been depressed to a predetermined amount or greater to cause a downshift, the revolution speed of the engine 14 has increased and the engine load by the MG1 has decreased, thus causing slipping. Therefore, the fuel supplied to the engine 14 by the fuel distribution device 92 is reduced so as to reduce the rotation (slipping) of the front wheels 66, 68, and at the same time the fuel is supplied to the fuel cell FC by the fuel distribution device 92 so as to carry out the assist operation, using electric energy supplied from the fuel cell FC to the MG2, in order to maintain the drive force of the entire vehicle.

According to this embodiment, the fuel distribution device 92 for distributing fuel to the fuel cell FC and the engine 14 is provided, and the fuel distribution device 92 is controlled during the traction control performed by the traction control unit 112. Thus, the traction control and the four-wheel drive control can be also accomplished by the distribution control performed by the fuel distribution device 92.

Namely, when a drive wheel(s) slips upon a power-on downshift, the output of the engine 14 is reduced so as to restrict the rotation of the front wheels 66, 68, and at the same time the fuel is supplied to the fuel cell FC by the fuel distribution device 92 so that the assist operation is performed using electric energy supplied from the fuel cell FC to the MG2, in order to maintain the drive force of the entire vehicle. Thus, favorable traction control and four-wheel drive running can be accomplished.

Figure 11:
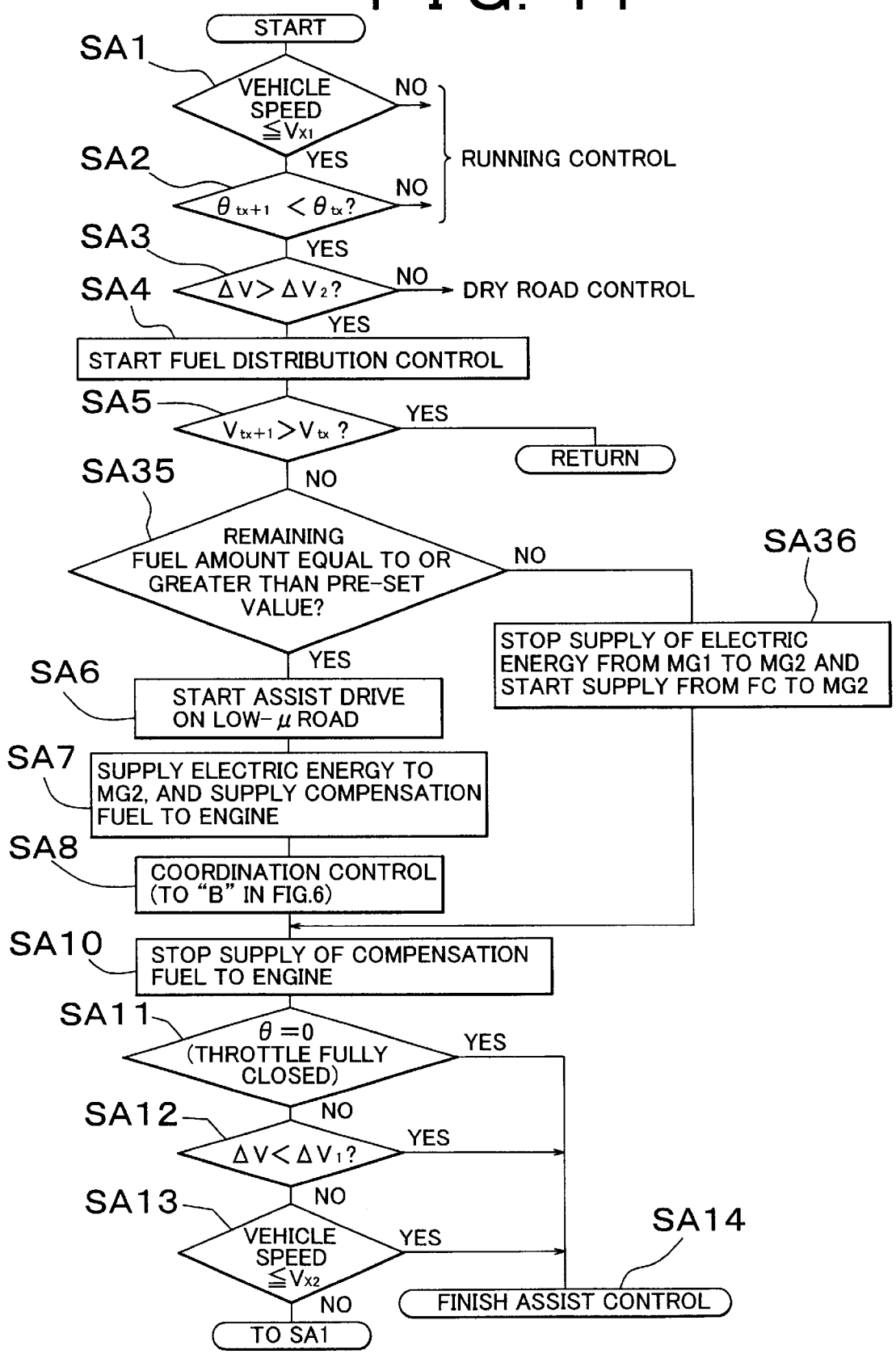
FIG. 11, corresponding to FIG. 5, is a flowchart illustrating control operations according to a further embodiment of the invention.

FIG. 11 is a flowchart illustrating a control routine that may replace the assist control routine illustrated in FIG. 5. The assist control routine of FIG. 11 is intended to give a higher priority to operating the fuel cell FC having a high fuel efficiency, if the remaining fuel becomes equal to or less than a predetermined amount during vehicle running. The routine of FIG. 11 differs from the routine of FIG. 5 in that steps SA9 and SA15 to SA19 are eliminated, and steps SA35 and SA36 following step SA5 are provided instead. The differences will be mainly described below.

Referring to FIG. 11, in SA35 corresponding to the fuel shortage determining unit 128, it is determined whether the remaining amount of fuel, such as a liquid fuel or gaseous fuel, in the fuel tank 88 is equal to or greater than a pre-set shortage judgment value. If an affirmative decision (YES) is obtained in step SA35, step SA6 and subsequent steps are then executed. Conversely, if a negative decision (NO) is obtained in step SA35, the control flow goes to step SA36 corresponding to the supply source switching unit 126. In step SA36, in order to stop the supply (direct supply) of electric energy from the MG1 driven by the engine 14 to the MG2 for the four-wheel drive, the fuel supply to the engine 14 is reduced or stopped by the fuel distribution device 92, thereby to idle or stop the engine 14. Furthermore, the clutches C1, C2 are disengaged or released thereby to disconnect the power transmission path from the engine 14 to the front wheels 66, 68. In the meantime, fuel is supplied to the fuel cell FC by the fuel distribution device 92 so that electric energy is supplied from the fuel cell FC to the MG2. Thus, two-wheel drive running is performed by the rear wheel drive system in which the MG2 having high mechanical transmission efficiency functions as a driving motor or power source. Where the four-wheel drive is needed, the first clutch C1 is engaged and electric energy is supplied from the fuel cell FC to the MG1, so that the front wheels 66, 68 are driven.

According to this embodiment, if the remaining amount of fuel, such as a liquid fuel or a gaseous fuel, in the fuel tank 88 becomes less than the predetermined amount, the operation of the engine 14 having a relatively low efficiency is stopped or limited while the fuel cell FC having a high efficiency is operated, so that the vehicle is driven by the rear wheel drive system in which the MG2, having a high mechanical transmission efficiency, functions as a driving motor, or by the four-wheel drive system combining the rear wheel drive and the front wheel drive. Therefore, the vehicle can travel as long a distance as possible with the remaining amount of fuel, assuring further improved fuel efficiency.

While the embodiments of the invention have been described with reference to the drawings, the invention may be otherwise embodied.

In the illustrated embodiments, the front- and rear-wheel (four-wheel) drive vehicle is of the type in which the front wheels 66, 68 are driven by the primary drive unit 10 including the engine 14 and the MG1, and the rear wheels 80, 82 are driven by the secondary drive unit 12 including the MG2. However, the four-wheel drive vehicle may be of the type in which the rear wheels 80, 82 are driven by the primary drive unit 10 and the front wheels 66, 68 are driven by the secondary drive unit 12. Furthermore, the invention is applicable to vehicles in which one or two electric motors (motor-generators) are provided for driving the front wheels 66, 68 or the rear wheels 80, 82, or to vehicles in which a stepwise variable transmission that provides a plurality of gear positions is provided in place of the continuously variable transmission 20.

The embodiments illustrated in FIGS. 5, 7, 8, 10 and 11 may be concurrently executed by a control system of a single vehicle.

If the vehicle starts with a load that is equal to or less than a predetermined value, the fuel required for starting of the vehicle may be partially supplied to the fuel cell FC, without being entirely supplied to the engine 14, so that the proportion of the drive force produced by the MG1 or the MG2 is increased for improved efficiency. While the assist drive is performed with electric energy supplied from the electric energy storage device 94 during vehicle starting or acceleration in the vehicle of the illustrated embodiments, the output of the fuel cell FC in addition to that of the storage device 94 may be used to perform the assist drive when the vehicle tends to be accelerated or require more power, or when the vehicles is insufficiently accelerated because of an increase in the onboard load.

When the vehicle as described above travels in a traffic jam, the front- wheel power transmission path may be brought into a neutral state so as to start the vehicle in the two-wheel drive mode with electric energy supplied from the MG1 to the MG2. If the accelerator pedal is operated to a certain degree, the two-wheel drive may be performed with electric energy supplied from the fuel cell FC to the MG2 so as to enhance the starting acceleration feeling. At intermediate and high vehicle speeds after the start, the output of the engine 14 may be controlled so as to supplement the shortage of the output of the MG2, so that desired vehicle acceleration can be accomplished by both the MG2 and the engine 14.

Still further, if the charged amount SOC of the electric energy storage device 94 is 100%, that is, there is no further room left for charging, during regeneration in the vehicle as described above, it is also possible to use electric energy produced by the regeneration to electrolyze water discharged from the fuel cell FC, or water discharged during dehumidification of the air-conditioner, or the like, and to supply resultant hydrogen to the fuel cell FC or the hydrogen reservoir 96.

Still further, if the traction effect of the above-described vehicle is reduced with a reduction in the load of the engine 14 due to high-speed revolution thereof upon acceleration during low-μ road assist driving, the output of the MG2 may be increased by limiting the fuel supply to the engine 14 and at the same time supplying the fuel to the fuel cell FC.

In order to achieve economical running, the vehicle as described above may be started with the MG1 and/or the MG2, and the engine 14 may be operated after the start, so as to prevent a vehicle start time lag. If the engine is not started, the supply from the fuel cell FC to the MG1 and/or the MG2 may be continued.

While some preferred embodiments of the invention have been described with reference to the drawings, it is to be understood that the foregoing embodiments are merely illustrative forms of the invention, and that the invention may also be embodied with various modifications or improvements, based on the knowledge of those skilled in the art.

What is claimed is:

1. A control system of a vehicle including a fuel cell and at least one electric motor that drives drive wheels of the vehicle with electric energy generated by the fuel cell, comprising:

an electric energy storage device;

controller configured to coordinate operations of the electric energy storage device and the fuel cell, so as to adjust output of the fuel cell and input and output of the electric energy storage device; and a traction controller configured to control output of the drive wheels so as to secure tractive force of the vehicle when a predetermined traction control start condition involving wheel slip is satisfied.

2. A control system of a vehicle including a fuel cell and at least one electric motor that drives drive wheels of the vehicle with electric energy generated by the fuel cell, comprising:

a traction controller configured to control output of the drive wheels so as to secure tractive force of the vehicle when a predetermined traction control start condition involving wheel slip is satisfied; and a fuel cell output controller configured to control output of the fuel cell during traction control by said traction controller.

3. The control system as defined in claim 2, further comprising:

an electric motor output controller configured to control output of the at least one electric motor; and an electric energy storage device;

wherein said fuel cell output controller reduces the output of the fuel cell, thereby to reduce the output of the at least one electric motor during traction control by said traction controller; and wherein, if the output of the at least one electric motor is to be subsequently increased, said electric motor output controller increases output torque of the at least one electric motor by using electric energy from the electric energy storage device.

4. The control system as defined in claim 1, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor.

5. A control system of a vehicle including a fuel cell and at least one electric motor that drives drive wheels of the vehicle with electric energy generated by the fuel cell, comprising:

a traction controller configured to control output of the drive wheels so as to secure tractive force of the vehicle when a predetermined traction control start condition involving wheel slip is satisfied, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor;

an electric motor output controller; and an electric energy storage device;

wherein said traction controller reduces output of the engine that drives the first set of wheels so as to perform traction control, and said electric motor output controller drives the at least one electric motor using electric energy supplied from at least one of the electric energy storage device and the fuel cell.

6. A control system of a vehicle including a fuel cell and at least one electric motor that drives drive wheels of the vehicle with electric energy generated by the fuel cell, comprising:

a traction controller configured to control output of the drive wheels so as to secure tractive force of the vehicle when a predetermined traction control start condition involving wheel slip is satisfied, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor;

an electric motor output controller;

wherein the vehicle further includes a generator that is driven by the engine, and said electric motor output controller drives the at least one electric motor that drives the second set of wheels, using electric energy supplied from the generator, and drives the at least one electric motor using electric energy supplied from the fuel cell when electric power generation of the generator is restricted.

7. The control system as defined in claim 4, further comprising:
   an electric motor output controller; and
   an electric energy storage device;
   wherein the vehicle further includes a generator that is driven by the engine, and said electric motor output controller drives the at least one electric motor using electric energy supplied from at least one of the electric energy storage device, the generator, and the fuel cell.

8. A control system of a vehicle including a fuel cell and at least one electric motor that drives drive wheels of the vehicle with electric energy generated by the fuel cell, comprising:
   a traction controller configured to control output of the drive wheels so as to secure tractive force of the vehicle when a predetermined traction control start condition involving wheel slip is satisfied, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor;
   an electric motor output controller;
   an electric energy storage device,
   a generator driven by the engine, said electric motor output controller driving the at least one electric motor using electric energy supplied from at least one of the electric energy storage device, the generator and the fuel cell; and
   a coordination controller configured to coordinate operations of the electric energy storage device, the generator, and the fuel cell, so as to adjust quantities of electric energy respectively supplied from the electric energy storage device, the generator, and the fuel cell, to the at least one electric motor.

9. A control system of a vehicle including a fuel cell and at least one electric motor that drives drive wheels of the vehicle with electric energy generated by the fuel cell, comprising:
   a traction controller configured to control output of the drive wheels so as to secure tractive force of the vehicle when a predetermined traction control start condition involving wheel slip is satisfied, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor; and
   a fuel distribution device that distributes fuel to the fuel cell and the engine, said traction controller controlling the fuel distribution device during traction control.

10. The control system as defined in claim 9, wherein the fuel distribution device reduces fuel to be supplied to the engine when an amount of fuel remaining in a fuel tank of the vehicle is equal to or less than a predetermined value.

11. A control system of a vehicle including a fuel cell and at least one electric motor that drives drive wheels of the vehicle with electric energy generated by the fuel cell, comprising:
   a traction controller configured to control output of the drive wheels so as to secure tractive force of the vehicle when a predetermined traction control start condition involving wheel slip is satisfied, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor,
   wherein said traction controller restricts output of the fuel cell when driving of the at least one electric motor is controlled by the output of the fuel cell during traction control.

12. A control system of a vehicle including a fuel cell and at least one electric motor that drives drive wheels of the vehicle with electric energy generated by the fuel cell, comprising:
   a traction controller configured to control output of the drive wheels so as to secure tractive force of the vehicle when a predetermined traction control start condition involving wheel slip is satisfied,
   wherein said at least one electric motor comprises first and second electric motors, wherein the vehicle includes a pair of front wheels and a pair of rear wheels, and wherein one of the pairs of front wheels and rear wheels is driven by at least the first electric motor, and the other of the pairs of front wheels and rear wheels is driven by the second electric motor.

13. The control system as defined in claim 1, wherein said traction controller performs traction control by operating wheel brakes that apply braking force to wheels of the vehicle.

14. A control system of a vehicle including a fuel cell and at least one electric motor that drives drive wheels of the vehicle with electric energy generated by the fuel cell, comprising:
   a traction controller configured to control output of the drive wheels so as to secure tractive force of the vehicle when a predetermined traction control start condition involving wheel slip is satisfied and;
   a correcting unit that corrects traction control by said traction controller, based on an operating condition of the fuel cell.

15. A control system of a vehicle including a fuel cell and at least one electric motor that drives drive wheels of the vehicle with electric energy generated by the fuel cell, comprising:
   electric energy storage means;
   coordination controller means for coordinating operations of the electric energy storage means and the fuel cell, so as to adjust output of the fuel cell and input and output of the electric energy storage device; and
   a traction controller means for controlling output of the drive wheels so as to secure tractive force of the vehicle when a predetermined traction control start condition is satisfied.

16. A control system of a vehicle including a fuel cell and at least one electric motor that drives drive wheels of the vehicle with electric energy generated by the fuel cell, comprising:
   means for determining whether a predetermined traction control start condition involving wheel slip is satisfied or not;
   traction controller means for controlling output of the drive wheels so as to secure tractive force of the vehicle when the predetermined traction control start condition is satisfied; and fuel cell output controller means for controlling output of the fuel cell during traction control by said traction controller means.

17. The control system as defined in claim 16, further comprising:

electric motor output controller means for controlling output of the at least one electric motor; and electric energy storage means;

wherein said fuel cell output controller means reduces the output of the fuel cell, thereby to reduce the output of the at least one electric motor during traction control by said traction controller means; and wherein, if the output of the at least one electric motor is to be subsequently increased, said electric motor output controller means increases output torque of the at least one electric motor by using electric energy from the electric energy storage means.

18. The control system as defined in claim 15, wherein the vehicle includes a first set of wheels and a second set of wheels, one of said first set and said second set comprising front wheels, the other of said first set and said second set comprising rear wheels, and wherein the first set of wheels are driven by at least an engine, and the second set of wheels are driven by the at least one electric motor.

19. A control system of a vehicle including a fuel cell and at least one electric motor that drives drive wheels of the vehicle with electric energy generated by the fuel cell, comprising:

means for determining whether a predetermined traction control start condition involving wheel slip is satisfied or not;

traction controller means for controlling output of the drive wheels so as to secure tractive force of the vehicle when the predetermined traction control start condition is satisfied, wherein the vehicle includes a first set of wheels and a second set of wheels, one of said first set and said second set comprising front wheels, the other of said first set and said second set comprising rear wheels, and wherein the first set of wheels are driven by at least an engine, and the second set of wheels are driven by the at least one electric motor;

electric motor output controller means; and electric energy storage means;

wherein said traction controller means reduces output of the engine that drives the first set of wheels so as to perform traction control, and said electric motor output controller means drives the at least one electric motor using electric energy supplied from the electric energy storage means and the fuel cell.

20. A control system of a vehicle including a fuel cell and at least one electric motor that drives drive wheels of the vehicle with electric energy generated by the fuel cell, comprising:

means for determining whether a predetermined traction control start condition involving wheel slip is satisfied or not;

traction controller means for controlling output of the drive wheels so as to secure tractive force of the vehicle when the predetermined traction control start condition is satisfied, wherein the vehicle includes a first set of wheels and a second set of wheels, one of said first set and said second set comprising front wheels, the other of said first set and said second set comprising rear wheels, and wherein the first set of wheels are driven by at least an engine, and the second set of wheels are driven by the at least one electric motor; and an electric motor output controller means;

wherein the vehicle further includes a generator that is driven by the engine, and said electric motor output controller means drives the at least one electric motor that drives the second set of wheels, using electric energy supplied from the generator, and drives the at least one electric motor using electric energy supplied from the fuel cell when electric power generation of the generator is restricted.

21. The control system as defined in claim 18, further comprising:

an electric motor output controller means; and an electric energy storage means;

wherein the vehicle further includes a generator that is driven by the engine, and said electric motor output controller means drives the at least one electric motor using electric energy supplied from at least one of the electric energy storage means, the generator, and the fuel cell.

22. A control system of a vehicle including a fuel cell and at least one electric motor that drives drive wheels of the vehicle with electric energy generated by the fuel cell, comprising:

means for determining whether a predetermined traction control start condition involving wheel slip is satisfied or not;

traction controller means for controlling output of the drive wheels so as to secure tractive force of the vehicle when the predetermined traction control start condition is satisfied, wherein the vehicle includes a first set of wheels and a second set of wheels, one of said first set and said second set comprising front wheels, the other of said first set and said second set comprising rear wheels, and wherein the first set of wheels are driven by at least an engine, and the second set of wheels are driven by the at least one electric motor;

an electric motor output controller means;

an electric energy storage means, a generator driven by the engine, wherein said electric motor output controller means drives the at least one electric motor using electric energy supplied from at least one of the electric energy storage means, the generator and the fuel cell; and a coordination controller means for coordinating operations of the electric energy storage means, the generator, and the fuel cell, so as to adjust quantities of electric energy respectively supplied from the electric energy storage means, the generator, and the fuel cell, to the at least one electric motor.

23. A control system of a vehicle including a fuel cell and at least one electric motor that drives drive wheels of the vehicle with electric energy generated by the fuel cell, comprising:

means for determining whether a predetermined traction control start condition involving wheel slip is satisfied or not;

traction controller means for controlling output of the drive wheels so as to secure tractive force of the vehicle when the predetermined traction control start condition is satisfied, wherein the vehicle includes a first set of wheels and a second set of wheels, one of said first set and said second set comprising front wheels, the other of said first set and said second set comprising rear wheels, and wherein the first set of wheels are driven by at least an engine, and the second set of wheels are driven by the at least one electric motor; and fuel distribution means for distributing fuel to the fuel cell and the engine, said traction controller means controlling the fuel distribution means during traction control.

24. The control system as defined in claim 23, wherein the fuel distribution means reduces fuel to be supplied to the engine when an amount of fuel remaining in a fuel tank of the vehicle is equal to or less than a predetermined value.

25. A control system of a vehicle including a fuel cell and at least one electric motor that drives drive wheels of the vehicle with electric energy generated by the fuel cell, comprising:

means for determining whether a predetermined traction control start condition involving wheel slip is satisfied or not; and traction controller means for controlling output of the drive wheels so as to secure tractive force of the vehicle when the predetermined traction control start condition is satisfied, wherein the vehicle includes a first set of wheels and a second set of wheels, one of said first set and said second set comprising front wheels, the other of said first set and said second set comprising rear wheels, and wherein the first set of wheels are driven by at least an engine, and the second set of wheels are driven by the at least one electric motor, wherein said traction controller means restricts output of the fuel cell when driving of the at least one electric motor is controlled by the output of the fuel cell during traction control.

26. The control system as defined in claim 15, wherein said at least one electric motor comprises first and second electric motors, wherein the vehicle includes a pair of front wheels and a pair of rear wheels, and wherein one of the pairs of front wheels and rear wheels is driven by at least the first electric motor, and the other of the pairs of front wheels and rear wheels is driven by the second electric motor.

27. A control system according to claim 15, wherein said traction controller means performs traction control by operating wheel brakes that apply braking force to wheels of the vehicle.

28. A control system of a vehicle including a fuel cell and at least one electric motor that drives drive wheels of the vehicle with electric energy generated by the fuel cell, comprising:

means for determining whether a predetermined traction control start condition involving wheel slip is satisfied or not;

traction controller means for controlling output of the drive wheels so as to secure tractive force of the vehicle when the predetermined traction control start condition is satisfied; and correcting means for correcting traction control by said traction controller means, based on an operating condition of the fuel cell.

29. A control method in a vehicle including a fuel cell, an electric energy storage device, and at least one electric motor, comprising:

coordinating operations of the electric energy storage device and the fuel cell, so as to adjust output of the fuel cell and input and output of the electric energy storage device, driving drive wheels of the vehicle with electric energy generated by the fuel cell, and using a traction controller to control output of the drive wheels so as to secure tractive force of the vehicle when a predetermined traction control start condition involving wheel slip is satisfied.

30. A control method in a vehicle including a fuel cell and at least one electric motor, comprising the steps of:

driving drive wheels of the vehicle with electric energy generated by the fuel cell;

using a traction controller to control output of the drive wheels so as to secure tractive force of the vehicle when a predetermined traction control start condition involving wheel slip is satisfied; and using a fuel cell output controller to control output of the fuel cell during traction control by said traction controller.

31. The control method as defined in claim 30, further comprising:

using an electric motor output controller to control output of the at least one electric motor;

using said fuel cell output controller to reduce the output of the fuel cell, thereby to reduce the output of the at least one electric motor during traction control by said traction controller; and when the output of the at least one electric motor is to be subsequently increased, using said electric motor output controller to increase output torque of the at least one electric motor by using electric energy from an electric energy storage device.

32. The control method as defined in claim 29, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor.

33. A control method in a vehicle including a fuel cell and at least one electric motor, comprising the steps of:

driving drive wheels of the vehicle with electric energy generated by the fuel cell;

using a traction controller to control output of the drive wheels so as to secure tractive force of the vehicle when a predetermined traction control start condition involving wheel slip is satisfied, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor;

using an electric motor output controller to control output of the at least one electric motor;

using an electric energy storage device; and using said traction controller to reduce output of the engine that drives the first set of wheels so as to perform traction control, and using said electric motor output controller to drive the at least one electric motor with electric energy supplied from the electric energy storage device and the fuel cell.

34. A control method in a vehicle including a fuel cell and at least one electric motor, comprising the steps of:

driving drive wheels of the vehicle with electric energy generated by the fuel cell, using a traction controller to control output of the drive wheels so as to secure tractive force of the vehicle when a predetermined traction control start condition involving wheel slip is satisfied, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor; and using an electric motor output controller to control output of the at least one electric motor;

wherein the vehicle further includes a generator that is driven by the engine, and said electric motor output controller drives the at least one electric motor that drives the second set of wheels, using electric energy supplied from the generator, and drives the at least one electric motor using electric energy supplied from the fuel cell when electric power generation of the generator is restricted.

35. The control method as defined in claim 32, further comprising:

using an electric motor output controller to control output of the at least one electric motor; and using an electric energy storage device;

wherein the vehicle further includes a generator that is driven by the engine, and said electric motor output controller drives the at least one electric motor using electric energy supplied from at least one of the electric energy storage device, the generator, and the fuel cell.

36. The control method as defined in claim 35, further comprising the step of coordinating operations of the electric energy storage device, the generator, and the fuel cell, so as to adjust quantities of electric energy respectively supplied from the electric energy storage device, the generator, and the fuel cell, to the at least one electric motor.

37. A control method in a vehicle including a fuel cell and at least one electric motor, comprising the steps of:

driving drive wheels of the vehicle with electric energy generated by the fuel cell;

using a traction controller to control output of the drive wheels so as to secure tractive force of the vehicle when a predetermined traction control start condition involving wheel slip is satisfied, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor; and using a fuel distribution device to distribute fuel to the fuel cell and the engine, said traction controller controlling the fuel distribution device during traction control.

38. The control method as defined in claim 37, wherein the fuel distribution device reduces fuel to be supplied to the engine when an amount of fuel remaining in a fuel tank of the vehicle is equal to or less than a predetermined value.

39. A control method in a vehicle including a fuel cell and at least one electric motor, comprising the steps of:

driving drive wheels of the vehicle with electric energy generated by the fuel cell, using a traction controller to control output of the drive wheels so as to secure tractive force of the vehicle when a predetermined traction control start condition involving wheel slip is satisfied, wherein the vehicle includes a first set of wheels and a second set of wheels, one of said first set and said second set comprising front wheels, the other of said first set and said second set comprising rear wheels, and wherein said first set of wheels are driven by at least an engine, and said second set of wheels are driven by the at least one electric motor, and restricting output of the fuel cell when driving of the at least one electric motor is controlled by the output of the fuel cell during traction control.

40. The control method as defined in claim 29, wherein said at least one electric motor comprises first and second electric motors, wherein one of pairs of front wheels and rear wheels is driven by at least the first electric motor, and the other of the pairs of front wheels and rear wheels is driven by the second electric motor.

41. A control method as defined in claim 29, wherein said traction controller operates wheel brakes that apply braking force to wheels of the vehicle.

42. A control method in a vehicle including a fuel cell and at least one electric motor, comprising the steps of:

driving drive wheels of the vehicle with electric energy generated by the fuel cell;

using a traction controller to control output of the drive wheels so as to secure tractive force of the vehicle when a predetermined traction control start condition involving wheel slip is satisfied; and correcting traction control by said traction controller, based on an operating condition of the fuel cell.

43. The control system as defined in claim 12, wherein said one of the pairs of front wheels and rear wheels is further driven by an engine.

44. The control system as defined in claim 26, wherein said one of the pairs of front wheels and rear wheels is further driven by an engine.

45. The control method as defined in claim 40, wherein said one of the pairs of front wheels and rear wheels is further driven by an engine.

46. A control system of a vehicle including a fuel cell and at least one electric motor that drives drive wheels of the vehicle with electric energy generated by the fuel cell, comprising:

a brakes controller that controls application of braking force to wheels of the vehicle:

a traction controller configured to control output of the drive wheels so as to secure tractive force of the vehicle when a predetermined traction control start condition involving wheel slip is satisfied; and a coordination controller that coordinates operations of the brakes controller, and the traction controller.

47. A control system of a vehicle including a fuel cell and at least one electric motor that drives drive wheels of the vehicle with electric energy generated by the fuel cell, comprising:

a brakes controller means for controlling application of braking force to wheels of the vehicle:

a traction controller means for controlling output of the drive wheels so as to secure tractive force of the vehicle when a predetermined traction control start condition is satisfied; and a coordination controller means for coordinating operations of the brakes controller, and the traction controller.

48. A control method in a vehicle including a fuel cell and at least one electric motor, comprising:

controlling application of braking force to wheels of the vehicle, driving drive wheels of the vehicle with electric energy generated by the fuel cell, using a traction controller to control output of the drive wheels so as to secure tractive force of the vehicle when a predetermined traction control start condition involving wheel slip is satisfied, and coordinating operations of the brakes controller, and the traction controller.

* * * * *